United States Patent
Harada et al.

(10) Patent No.: US 10,040,884 B2
(45) Date of Patent: Aug. 7, 2018

(54) ETHYLENE/α-OLEFIN COPOLYMERS AND LUBRICATING OILS

(71) Applicant: MITSUI CHEMICALS, INC., Tokyo (JP)

(72) Inventors: Katsuyoshi Harada, Chiba (JP); Koji Endo, Chiba (JP); Tomoaki Mizukawa, Ichihara (JP); Sadahiko Matsuura, Iwakuni (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/129,325

(22) PCT Filed: Mar. 26, 2015

(86) PCT No.: PCT/JP2015/059487
§ 371 (c)(1),
(2) Date: Sep. 26, 2016

(87) PCT Pub. No.: WO2015/147215
PCT Pub. Date: Oct. 1, 2015

(65) Prior Publication Data
US 2017/0114166 A1    Apr. 27, 2017

(30) Foreign Application Priority Data
Mar. 28, 2014 (JP) .................. 2014-068586

(51) Int. Cl.
| C08F 210/16 | (2006.01) |
| C08F 4/6592 | (2006.01) |
| C10M 107/06 | (2006.01) |
| C08F 4/659 | (2006.01) |

(52) U.S. Cl.
CPC ........ *C08F 210/16* (2013.01); *C08F 4/65927* (2013.01); *C10M 107/06* (2013.01); *C08F 4/65912* (2013.01); *C10M 2205/0245* (2013.01); *C10N 2220/022* (2013.01); *C10N 2240/04* (2013.01)

(58) Field of Classification Search
CPC . C08F 210/16; C08F 4/65912; C08F 4/65927
See application file for complete search history.

(56) References Cited

U.S. PATENT DOCUMENTS

| 3,780,128 A | 12/1973 | Shubkin |
| 3,909,432 A | 9/1975 | McGuire et al. |
| 4,032,591 A | 6/1977 | Cupples et al. |
| 4,668,834 A | 5/1987 | Rim et al. |
| 4,704,491 A | 11/1987 | Tsutsui et al. |
| 4,874,880 A | 10/1989 | Miya et al. |
| 4,892,851 A | 1/1990 | Ewen et al. |
| 4,956,512 A | 9/1990 | Nissfolk et al. |
| 4,960,878 A | 10/1990 | Crapo et al. |
| 4,990,640 A | 2/1991 | Tsutsui et al. |
| 5,026,798 A | 6/1991 | Canich |
| 5,041,584 A | 8/1991 | Crapo et al. |
| 5,055,438 A | 10/1991 | Canich |
| 5,057,475 A | 10/1991 | Canich et al. |
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,195,401 A | 3/1993 | Mouton |
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatky et al. |

(Continued)

FOREIGN PATENT DOCUMENTS

| CN | 1261463 C | 6/2006 |
| CN | 102549126 A | 7/2012 |

(Continued)

OTHER PUBLICATIONS

M.W. Ranney, "Lubricant Additive", Translated by Shichuan QIAN, Xun Li, Peilong Yu, Published by Petroleum Industry Press, issued by Beijing Distribution Agency of Xinhua Bookstore, First issued and first printed at Beijing in Feb. 1980, p. 115, with its English translation.

(Continued)

*Primary Examiner* — Caixia Lu
(74) *Attorney, Agent, or Firm* — Foley & Lardner LLP

(57) ABSTRACT

The invention has an object of providing ethylene/α-olefin copolymers having high randomness and a small number of double bonds in the copolymers. The ethylene/α-olefin copolymers of the invention are obtained by copolymerizing ethylene and an α-olefin having 3 to 20 carbon atoms in the presence of an olefin polymerization catalyst which includes a bridged metallocene compound (A) represented by the formula [I], and at least one compound (B) selected from organometallic compounds (B-1), organoaluminum oxy compounds (B-2) and compounds (B-3) capable of reacting with the bridged metallocene compound (A) to form an ion pair, and have a specific weight average molecular weight, a specific molecular weight distribution, a specific glass transition point and a specific value B.

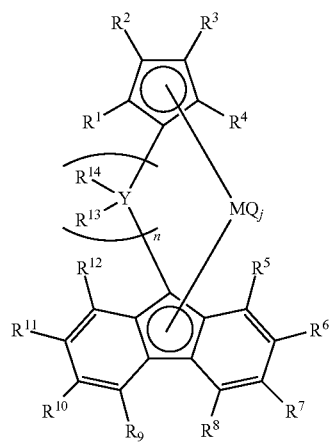

[I]

15 Claims, No Drawings

(56) References Cited

U.S. PATENT DOCUMENTS

| | | |
|---|---|---|
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,281,679 A | 1/1994 | Jejelowo et al. |
| 5,292,838 A | 3/1994 | Razavi |
| 5,292,845 A | 3/1994 | Kawasaki et al. |
| 5,304,523 A | 4/1994 | Razavi |
| 5,321,106 A | 6/1994 | Lapointe |
| 5,334,677 A | 8/1994 | Razavi et al. |
| 5,359,015 A | 10/1994 | Jejelowo |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,811 A | 11/1995 | Jejelowo et al. |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,536,796 A | 7/1996 | Jejelowo et al. |
| 5,547,675 A | 8/1996 | Canich |
| 5,561,092 A | 10/1996 | Ewen et al. |
| 5,589,556 A | 12/1996 | Razavi |
| 5,599,761 A | 2/1997 | Turner |
| 5,614,457 A | 3/1997 | Ewen et al. |
| 5,621,126 A | 4/1997 | Canich et al. |
| 5,631,391 A | 5/1997 | Canich |
| 5,663,249 A | 9/1997 | Ewen et al. |
| 5,723,560 A | 3/1998 | Canich |
| 5,763,549 A | 6/1998 | Elder et al. |
| 5,767,331 A | 6/1998 | Oda et al. |
| 5,801,113 A | 9/1998 | Jejelowo et al. |
| 5,807,939 A | 9/1998 | Elder et al. |
| 5,883,202 A | 3/1999 | Ewen et al. |
| 5,955,639 A | 9/1999 | Oda et al. |
| 6,008,164 A | 12/1999 | Aldrich et al. |
| 6,059,955 A | 5/2000 | Cody et al. |
| 6,080,301 A | 6/2000 | Berlowitz et al. |
| 6,090,989 A | 7/2000 | Trewella et al. |
| 6,096,940 A | 8/2000 | Wittenbrink et al. |
| 6,103,099 A | 8/2000 | Wittenbrink et al. |
| 6,121,395 A | 9/2000 | Turner |
| 6,136,930 A | 10/2000 | Bamberger et al. |
| 6,143,854 A | 11/2000 | Bamberger et al. |
| 6,153,807 A | 11/2000 | Oda et al. |
| 6,165,949 A | 12/2000 | Berlowitz et al. |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| 6,332,974 B1 | 12/2001 | Wittenbrink et al. |
| 6,355,592 B1 | 3/2002 | Hlatky et al. |
| 6,384,158 B1 | 5/2002 | Bamberger et al. |
| 6,417,120 B1 | 7/2002 | Mitchler et al. |
| 6,420,618 B1 | 7/2002 | Berlowitz et al. |
| 6,423,795 B1 | 7/2002 | Canich et al. |
| 6,475,960 B1 | 11/2002 | Berlowitz et al. |
| 6,506,297 B1 | 1/2003 | Wittenbrink et al. |
| 6,518,215 B1 | 2/2003 | Bamberger et al. |
| 6,599,864 B1 | 7/2003 | Bertomeu |
| 6,608,000 B1 | 8/2003 | Bamberger et al. |
| 6,617,466 B1 | 9/2003 | Canich |
| 6,632,898 B1 | 10/2003 | Canich |
| 7,041,841 B1 | 5/2006 | Canich |
| 7,163,907 B1 | 1/2007 | Canich et al. |
| 7,241,848 B2 | 7/2007 | Tohi et al. |
| 7,569,646 B1 | 8/2009 | Canich |
| 7,915,358 B2 | 3/2011 | Ikeda et al. |
| 8,618,033 B2 | 12/2013 | Kolb et al. |
| 9,045,574 B2 | 6/2015 | Ikeda et al. |
| 9,416,206 B2 | 8/2016 | Kolb et al. |
| 2002/0086803 A1 | 7/2002 | Berlowitz et al. |
| 2002/0155776 A1 | 10/2002 | Mitchler et al. |
| 2004/0122191 A1 | 6/2004 | Arjunan et al. |
| 2004/0127654 A1 | 7/2004 | Brant et al. |
| 2005/0131171 A1 | 6/2005 | Tohi et al. |
| 2006/0009595 A1 | 1/2006 | Rix et al. |
| 2006/0025545 A1 | 2/2006 | Brant et al. |
| 2006/0178491 A1 | 8/2006 | Canich |
| 2006/0211832 A1 | 9/2006 | Brant et al. |
| 2006/0276607 A1 | 12/2006 | Ikenaga et al. |
| 2006/0293474 A1 | 12/2006 | Brant et al. |
| 2008/0085977 A1 | 4/2008 | Okamoto et al. |
| 2008/0090974 A1 | 4/2008 | Brant et al. |
| 2008/0153996 A1 | 6/2008 | Friedersdorf et al. |
| 2008/0153997 A1 | 6/2008 | Casty et al. |
| 2008/0171651 A1 | 7/2008 | Tohi et al. |
| 2008/0188635 A1 | 8/2008 | Brant et al. |
| 2008/0214767 A1 | 9/2008 | Mehta et al. |
| 2008/0234443 A1 | 9/2008 | Kiss et al. |
| 2008/0281040 A1 | 11/2008 | Kiss et al. |
| 2008/0292896 A1 | 11/2008 | Ikenaga et al. |
| 2008/0306219 A1 | 12/2008 | Ikenaga et al. |
| 2008/0306234 A1 | 12/2008 | Ikenaga et al. |
| 2008/0312461 A1 | 12/2008 | Ikenaga et al. |
| 2009/0043050 A1 | 2/2009 | Ikenaga et al. |
| 2009/0209721 A1 | 8/2009 | Ikeda et al. |
| 2011/0183878 A1 | 7/2011 | Kolb et al. |
| 2011/0183879 A1 | 7/2011 | Kolb et al. |
| 2011/0196103 A1 | 8/2011 | Kawahara et al. |
| 2012/0190601 A1 | 7/2012 | Ikeda et al. |
| 2016/0347893 A1 | 12/2016 | Kolb et al. |

FOREIGN PATENT DOCUMENTS

| | | |
|---|---|---|
| CN | 101142272 B | 9/2012 |
| EP | 0 200 351 A2 | 5/1986 |
| EP | 0 200 351 A3 | 5/1986 |
| EP | 0 668 342 A1 | 8/1995 |
| EP | 0 776 959 A2 | 6/1997 |
| EP | 2 243 795 A1 | 10/2010 |
| EP | 1 029 029 B1 | 6/2013 |
| JP | S57-117595 A | 7/1982 |
| JP | S61-221207 A | 10/1986 |
| JP | H01-163136 A | 6/1989 |
| JP | H01-501950 A | 7/1989 |
| JP | H01-502036 A | 7/1989 |
| JP | H02-001163 B2 | 1/1990 |
| JP | H02-024701 A | 1/1990 |
| JP | H02-007998 B2 | 2/1990 |
| JP | H02-078687 A | 3/1990 |
| JP | H02-167305 A | 6/1990 |
| JP | H03-103407 A | 4/1991 |
| JP | H03-179005 A | 8/1991 |
| JP | H03-179006 A | 8/1991 |
| JP | H03-207703 A | 9/1991 |
| JP | H03-207704 A | 9/1991 |
| JP | H04-069394 A | 3/1992 |
| JP | H06-172433 A | 6/1994 |
| JP | H06-062642 B2 | 8/1994 |
| JP | H07-121969 B2 | 12/1995 |
| JP | 2796376 B2 | 9/1998 |
| JP | 2004-051676 A | 2/2004 |
| JP | 2008-505932 A | 2/2008 |
| JP | 4367687 B2 | 11/2009 |
| JP | 2011-001489 A | 1/2011 |
| JP | 2011-001497 A | 1/2011 |
| JP | 2011-219777 A | 11/2011 |
| JP | 2013-517369 A | 5/2013 |
| JP | 2013-177641 A | 9/2013 |
| WO | WO-95/04761 A1 | 2/1995 |
| WO | WO-97/21788 A1 | 6/1997 |
| WO | WO-99/41332 A1 | 8/1999 |
| WO | WO-00/08115 A1 | 2/2000 |
| WO | WO-00/14179 A1 | 3/2000 |
| WO | WO-00/14183 A1 | 3/2000 |
| WO | WO-00/14187 A2 | 3/2000 |
| WO | WO-00/14188 A2 | 3/2000 |
| WO | WO-00/15736 A2 | 3/2000 |
| WO | WO-01/18156 A1 | 3/2001 |
| WO | WO-01/57166 A1 | 8/2001 |

(56) References Cited

FOREIGN PATENT DOCUMENTS

| WO | WO-2004/087775 A1 | 10/2004 |
| WO | WO 2011/037585 A1 | 3/2011 |
| WO | WO 2011/038331 A1 | 3/2011 |
| WO | WO 2011/090859 A1 | 7/2011 |

OTHER PUBLICATIONS

Office Action dated Jun. 13, 2017 in Korean Patent Application No. 10-2016-7025225.
Office Action dated Jun. 22, 2017 in Chinese Patent Application No. 201580015347.6.
US 5,168,111 Dec. 1, 1992 Canish, Jo Ann M. (withdrawn).
Hsieh et al., "Ethylene-1-Butene Copolymers. 1. Comonomer Sequence Distribution," Macromolecules 15(2):353-360 (Mar.-Apr. 1982).
Patsidis et al., The synthesis, characterization and polymerization behavior of ansa cyclopentadienyl fluorenyl complexes; the X-ray structures of the complexes $[(C_{13}H_8)SiR_2(C_5H_4)]ZRCI_2$ (R=Me or PH), J. Organomet. Chem. 509:63-71 (1996).
Ray et al., "Carbon-13 Nuclear Magnetic Resonance Determination of Monomer Composition and Sequence Distributions in Ethylene-Propylene Copolymers Prepared with a Stereoregular Catalyst System," Macromolecules 10(4):773-778 (Jul.-Aug. 1977).
International Search Report issued in International Patent Application No. PCT/JP2015/059487 dated Apr. 21, 2015.
Extended European Search Report dated Nov. 6, 2017 in corresponding application No. 15767983.8.

ETHYLENE/α-OLEFIN COPOLYMERS AND LUBRICATING OILS

CROSS-REFERENCE TO RELATED APPLICATIONS

The present application is a U.S. national stage application claiming the benefit of International Patent Application No. PCT/JP2015/059487, filed Mar. 26, 2015, which claims the benefit of priority to Japanese Patent Application No. 2014-068586, filed Mar. 28, 2014, the entireties of which are hereby incorporated by reference.

TECHNICAL FIELD

The present invention relates to ethylene/α-olefin copolymers. More specifically, the invention relates to ethylene/α-olefin copolymers obtained by copolymerizing ethylene and an α-olefin in the presence of an olefin polymerization catalyst including a specific bridged metallocene compound and to uses of the copolymers.

BACKGROUND ART

Poly-α-olefins (PAOs) are frequently used in industry as synthetic lubricant base oils for lubricating oils such as automobile gear oils, engine oils, industrial lubricating oils and hydraulic oils. Such PAOs may be obtained by oligomerizing higher α-olefins with acid catalysts (see, for example, Patent Literatures 1 to 3). Meanwhile, it is known that ethylene.α-olefin copolymers are also usable as synthetic lubricating oils excellent in viscosity index, oxidation stability, shear stability and heat resistance (see, for example, Patent Literature 4).

In recent years, the conditions under which lubricating oils are used have become more extreme and at the same time the extension of life is required out of consideration for environmental problems. Thus, while there has been a tendency toward an increase in demands for synthetic lubricating oils such as PAOs and ethylene.propylene copolymers having excellent low-temperature viscosity characteristics, heat resistance and oxidation stability, further improvements in viscosity index and low-temperature viscosity characteristics are desired from the points of view of fuel efficiency and energy saving.

In particular, the request for higher fuel efficiency has been increasing day by day and consequently an approach is adopted in which the viscosity of lubricating oils themselves is lowered in order to reduce the resistance incurred during stirring of the lubricating oils. This approach also gives rise to a risk that metallic parts are brought into contact with each other due to the depression in lubricating performance. Thus, the designing of lubricating oils involves considering the balance between the conditions and loads under which the oils are used, and the viscosity of the lubricating oils. Such designing should take into account the drop in viscosity ascribed to the degradation of lubricating oils during use, specifically, the breakage of the molecules of lubricant oil materials mainly due to shear stress. Such a decrease in viscosity increases the risk of metallic contact between gears or bearings. It is therefore usually necessary that the initial viscosity of lubricating oils as produced be higher than the designed optimum viscosity by a degree depending on the shear stability of the materials used. Thus, there has been a strong need for lubricating oils with excellent shear stability in order to attain the maximum reduction in initial viscosity.

The production of ethylene.α-olefin copolymers used as synthetic lubricating oils conventionally involves a vanadium catalyst including a vanadium compound and an organoaluminum compound (see, for example, Patent Literatures 5 and 6). The main ethylene.α-olefin copolymers produced by such a method are ethylene.propylene copolymers.

Further, catalyst systems including a metallocene compound such as zirconocene and an organoaluminum oxy compound (aluminoxane) are known to afford copolymers with high polymerization activity (see, for example, Patent Literatures 7 and 8). Patent Literature 9 discloses a method for producing a synthetic lubricating oil that includes an ethylene.α-olefin copolymer obtained with use of a catalyst system combining a specific metallocene catalyst and an aluminoxane.

Ethylene.α-olefin copolymers used in lubricating oils desirably have high randomness in order to meet low-temperature viscosity characteristics that are required. In solution polymerization, high polymerization temperatures are generally considered as preferable because the productivity is enhanced. However, it is known to those skilled in the art that the randomness of olefin polymers produced is decreased with increasing polymerization temperature. Because of this fact, the upper limit of the polymerization temperature is depressed in many cases. Thus, polymerization catalysts which can give highly random olefin polymers even at high polymerization temperatures are desired in order to solve such problems.

Further, ethylene.α-olefin copolymers used in lubricating oils are required to be stable to oxidation. It is therefore desirable that the copolymers have a small number of double bonds. Although the number of double bonds can be reduced by hydrogenating the copolymers, copolymerization directly giving polymers with less double bonds is advantageous in that the process is simplified. Thus, polymerization catalysts capable of affording copolymers having less double bonds are desired.

CITATION LIST

Patent Literature

Patent Literature 1: U.S. Pat. No. 3,780,128
Patent Literature 2: U.S. Pat. No. 4,032,591
Patent Literature 3: JP-A-H01-163136
Patent Literature 4: JP-A-S57-117595
Patent Literature 5: JP-B-H02-1163
Patent Literature 6: JP-B-H02-7998
Patent Literature 7: JP-A-S61-221207
Patent Literature 8: JP-B-H07-121969
Patent Literature 9: Japanese Patent No. 2796376

SUMMARY OF INVENTION

Technical Problem

In view of the problems in the art discussed above, an object of the present invention is to provide ethylene/α-olefin copolymers having high randomness and a small number of double bonds in the copolymers, and methods for producing such copolymers. From the points of view of fuel efficiency and energy saving in automobiles and industrial machines, another object of the invention is to provide lubricating oils which include the ethylene/α-olefin copolymers and have excellent shear stability and low-temperature viscosity characteristics.

Solution to Problem

The present inventors have carried out extensive studies to attain the above objects. As a result, the present inventors have found that the objects are achieved with ethylene/α-olefin copolymers produced by copolymerizing ethylene and an α-olefin in the presence of an olefin polymerization catalyst which includes a bridged metallocene compound having a specific bridged structure, and with lubricating oils including such copolymers. Specifically, the following are some of the aspects of the invention.

[1] An ethylene/α-olefin copolymer obtained by copolymerizing ethylene and an α-olefin having 3 to 20 carbon atoms in the presence of an olefin polymerization catalyst including:

a bridged metallocene compound (A) represented by the general formula [I] below, and at least one compound (B) selected from the group consisting of organometallic compounds (B-1), organoaluminum oxy compounds (B-2) and compounds (B-3) capable of reacting with the bridged metallocene compound (A) to form an ion pair, the ethylene/α-olefin copolymer satisfying the following conditions (1) to (4):

(1) the weight average molecular weight is in the range of 1,000 to 50,000;

(2) the molecular weight distribution (Mw/Mn, Mw: weight average molecular weight, Mn: number average molecular weight) measured by gel permeation chromatography (GPC) is not more than 2.5;

(3) the glass transition point (Tg) measured with a differential scanning calorimeter (DSC) is below −50° C.; and (4) the value B represented by the equation [1] below is not less than 1.1.

[Math. 1]

$$B = \frac{P_{OE}}{2P_O \cdot P_E} \qquad [1]$$

In the equation [1], $P_E$ is the molar fraction of ethylene components, $P_O$ is the molar fraction of α-olefin components, and $P_{OE}$ is the molar fraction of ethylene.α-olefin sequences relative to all dyad sequences.

[Chem. 1]

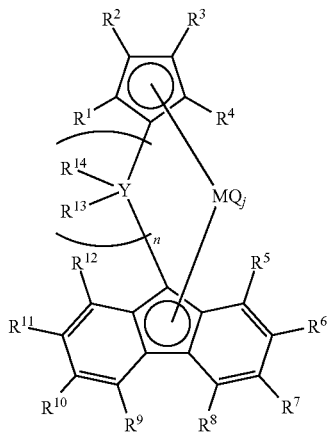

In the formula [I], $R^1$, $R^2$, $R^3$, $R^4$, $R^5$, $R^6$, $R^7$, $R^8$, $R^9$, $R^{10}$, $R^{11}$ and $R^{12}$ are each an atom or a substituent selected from the group consisting of a hydrogen atom, a hydrocarbon group having 1 to 20 carbon atoms, a silicon-containing group, a nitrogen-containing group, an oxygen-containing group, a halogen atom and a halogen-containing group, and may be the same as or different from one another, $R^{13}$ and $R^{14}$ are each an atom or a substituent selected from the group consisting of a hydrogen atom, a hydrocarbon group having 1 to 20 carbon atoms, an aryl group, a substituted aryl group, a silicon-containing group, a nitrogen-containing group, an oxygen-containing group, a halogen atom and a halogen-containing group, and may be the same as or different from each other, any adjacent substituents among $R^1$ to $R^{14}$ may be bonded together to form a ring, Y is selected from Group XIV atoms, M is a titanium atom, a zirconium atom or a hafnium atom, Q is a halogen atom, a hydrocarbon group having 1 to 20 carbon atoms, an anionic ligand or a neutral ligand capable of coordination through a lone pair of electrons, and may be the same or different when plural, n is an integer of 1 to 4, and j is an integer of 1 to 4.

[2] The ethylene/α-olefin copolymer described in Item [1], wherein n in the general formula [I] is 1.

[3] The ethylene/α-olefin copolymer described in Item [2], wherein $R^1$, $R^2$, $R^3$ and $R^4$ in the general formula [I] are all hydrogen atoms.

[4] The ethylene/α-olefin copolymer described in Item [3], wherein one of $R^{13}$ and $R^{14}$ in the general formula [I] is an aryl group or a substituted aryl group.

[5] The ethylene/α-olefin copolymer described in Item [4], wherein one of $R^{13}$ and $R^{14}$ in the general formula [I] is an aryl group or a substituted aryl group and the other is an alkyl group having 1 to 20 carbon atoms.

[6] The ethylene/α-olefin copolymer described in any one of Items [1] to [5], wherein M in the general formula [I] is a zirconium atom.

[7] The ethylene/α-olefin copolymer described in any one of Items [1] to [6], wherein the compound (B-3) is used as the component (B).

[8] The ethylene/α-olefin copolymer described in any one of Items [1] to [7], wherein the polymerization temperature in the copolymerization is not less than 130° C.

[9] The ethylene/α-olefin copolymer described in any one of Items [1] to [8], wherein the copolymer contains ethylene-derived structural units in the range of 30 to 70 mol %.

[10] A lubricating oil composition including the ethylene/α-olefin copolymer described in any one of Items [1] to [9].

[11] An automobile lubricating oil including the lubricating oil composition described in Item [10].

[12] The automobile lubricating oil described in Item [11], which is used as an automobile transmission oil and has a kinematic viscosity at 100° C. of not more than 7.5 mm²/s.

[13] An industrial lubricating oil including the lubricating oil composition described in Item [10].

[14] A method for producing ethylene/α-olefin copolymers including a step of copolymerizing ethylene and an α-olefin having 3 to 20 carbon atoms in the presence of an olefin polymerization catalyst including:

a bridged metallocene compound (A) represented by the general formula [I] described above, and at least one compound (B) selected from the group consisting of organometallic compounds (B-1), organoaluminum oxy compounds (B-2) and compounds (B-3) capable of reacting with the bridged metallocene compound (A) to form an ion pair, the ethylene/α-olefin copolymers satisfying the following conditions (1) to (4):

(1) the weight average molecular weight is in the range of 1,000 to 50,000;

(2) the molecular weight distribution (Mw/Mn, Mw: weight average molecular weight, Mn: number average molecular weight) measured by gel permeation chromatography (GPC) is not more than 2.5;

(3) the glass transition point (Tg) measured with a differential scanning calorimeter (DSC) is below −50° C.; and (4) the value B represented by the equation [1] described above is not less than 1.1.

[15] The method for producing ethylene/α-olefin copolymers described in Item [14], wherein n in the general formula [I] is 1.

[16] The method for producing ethylene/α-olefin copolymers described in Item 15, wherein $R^1$, $R^2$, $R^3$ and $R^4$ in the general formula [I] are all hydrogen atoms.

[17] The method for producing ethylene/α-olefin copolymers described in Item [16], wherein one of $R^{13}$ and $R^{14}$ in the general formula [I] is an aryl group or a substituted aryl group.

[18] The method for producing ethylene/α-olefin copolymers described in Item [17], wherein one of $R^{13}$ and $R^{14}$ in the general formula [I] is an aryl group or a substituted aryl group and the other is an alkyl group having 1 to 20 carbon atoms.

[19] The method for producing ethylene/α-olefin copolymers described in any one of Items [14] to [18], wherein M in the general formula [I] is a zirconium atom.

[20] The method for producing ethylene/α-olefin copolymers described in any one of Items [14] to [19], wherein the compound (B-3) is used as the component (B).

[21] The method for producing ethylene/α-olefin copolymers described in any one of Items [14] to [20], wherein the polymerization temperature in the copolymerization is not less than 130° C.

[22] The method for producing ethylene/α-olefin copolymers described in any one of Items [14] to [21], wherein the α-olefin is propylene.

[23] The method for producing ethylene/α-olefin copolymers described in any one of Items [14] to [22], wherein the content of ethylene-derived structural units in the copolymer is in the range of 30 to 70 mol %.

[24] A lubricating oil composition including an ethylene/α-olefin copolymer obtained by the method described in any one of Items [14] to [23].

[25] An automobile lubricating oil including the lubricating oil composition described in Item [24].

[26] The automobile lubricating oil described in Item [25], which is used as an automobile transmission oil and has a kinematic viscosity at 100° C. of not more than 7.5 $mm^2/s$.

[27] An industrial lubricating oil including the lubricating oil composition described in Item [24].

Effects of Invention

According to the method of the invention, ethylene and an α-olefin are copolymerized in the presence of an olefin polymerization catalyst which includes a bridged metallocene compound having a specific structure to give a highly random ethylene/α-olefin copolymer having a small number of double bonds in the copolymer. By the use of ethylene/α-olefin copolymers obtained by the production method, it is possible to further improve the shear stability and the low-temperature viscosity characteristics of lubricating oils.

EMBODIMENT FOR CARRYING OUT THE INVENTION

Hereinbelow, ethylene/α-olefin copolymers according to the present invention (hereinafter, also written simply as the "inventive copolymers"), methods for producing such copolymers and lubricating oils will be described in detail.

The inventive copolymers are produced by copolymerizing ethylene and an α-olefin having 3 to 20 carbon atoms in the presence of an olefin polymerization catalyst including a bridged metallocene compound (A) represented by the general formula [I] below, and at least one compound (B) selected from the group consisting of organometallic compounds (B-1), organoaluminum oxy compounds (B-2) and compounds (B-3) capable of reacting with the bridged metallocene compound (A) to form an ion pair.

[Chem. 2]

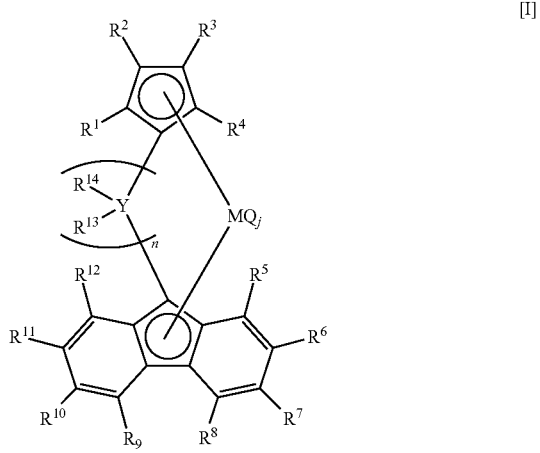

⟨Bridged Metallocene Compounds (A)⟩

The bridged metallocene compound (A) is represented by the above formula [I]. Y, M, $R^1$ to $R^{14}$, Q, n and j in the formula [I] will be described below.

(Y, M, $R^1$ to $R^{12}$, Q, n and j)

Y is a Group XIV atom and is, for example, a carbon atom, a silicon atom, a germanium atom or a tin atom, preferably a carbon atom or a silicon atom, and more preferably a carbon atom.

M is a titanium atom, a zirconium atom or a hafnium atom, and preferably a zirconium atom.

$R^1$ to $R^{12}$ are each an atom or a substituent selected from the group consisting of a hydrogen atom, a hydrocarbon group having 1 to 20 carbon atoms, a silicon-containing group, a nitrogen-containing group, an oxygen-containing group, a halogen atom and a halogen-containing group, and may be the same as or different from one another. Any adjacent substituents among $R^1$ to $R^{12}$ may be bonded together to form a ring or may not be bonded together.

Examples of the hydrocarbon groups having 1 to 20 carbon atoms include alkyl groups having 1 to 20 carbon atoms, cyclic saturated hydrocarbon groups having 3 to 20 carbon atoms, chain unsaturated hydrocarbon groups having 2 to 20 carbon atoms, cyclic unsaturated hydrocarbon groups having 3 to 20 carbon atoms, alkylene groups having 1 to 20 carbon atoms, and arylene groups having 6 to 20 carbon atoms.

Examples of the alkyl groups having 1 to 20 carbon atoms include linear saturated hydrocarbon groups such as methyl group, ethyl group, n-propyl group, allyl group, n-butyl group, n-pentyl group, n-hexyl group, n-heptyl group, n-octyl group, n-nonyl group and n-decanyl group, and branched saturated hydrocarbon groups such as isopropyl group, isobutyl group, s-butyl group, t-butyl group, t-amyl group, neopentyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methyl-1-isopropyl-2-methylpropyl group and cyclopropylmethyl group. The number of carbon atoms in the alkyl groups is preferably 1 to 6.

Examples of the cyclic saturated hydrocarbon groups having 3 to 20 carbon atoms include cyclic saturated hydrocarbon groups such as cyclopropyl group, cyclobutyl group, cyclopentyl group, cyclohexyl group, cycloheptyl group, cyclooctyl group, norbornenyl group, 1-adamantyl group and 2-adamantyl group; and groups resulting from the substitution of the cyclic saturated hydrocarbon groups with a $C_{1-17}$ hydrocarbon group in place of a hydrogen atom such as 3-methylcyclopentyl group, 3-methylcyclohexyl group, 4-methylcyclohexyl group, 4-cyclohexylcyclohexyl group and 4-phenylcyclohexyl group. The number of carbon atoms in the cyclic saturated hydrocarbon groups is preferably 5 to 11.

Examples of the chain unsaturated hydrocarbon groups having 2 to 20 carbon atoms include alkenyl groups such as ethenyl group (vinyl group), 1-propenyl group, 2-propenyl group (allyl group) and 1-methylethenyl group (isopropenyl group), and alkynyl groups such as ethynyl group, 1-propynyl group and 2-propynyl group (propargyl group). The number of carbon atoms in the chain unsaturated hydrocarbon groups is preferably 2 to 4.

Examples of the cyclic unsaturated hydrocarbon groups having 3 to 20 carbon atoms include cyclic unsaturated hydrocarbon groups such as cyclopentadienyl group, norbornyl group, phenyl group, naphthyl group, indenyl group, azulenyl group, phenanthryl group and anthracenyl group; groups resulting from the substitution of the cyclic unsaturated hydrocarbon groups with a $C_{1-15}$ hydrocarbon group in place of a hydrogen atom such as 3-methylphenyl group (m-tolyl group), 4-methylphenyl group (p-tolyl group), 4-ethylphenyl group, 4-t-butylphenyl group, 4-cyclohexylphenyl group, biphenylyl group, 3,4-dimethylphenyl group, 3,5-dimethylphenyl group and 2,4,6-trimethylphenyl group (mesityl group); and groups resulting from the substitution of the linear hydrocarbon groups or branched saturated hydrocarbon groups with a $C_{3-19}$ cyclic saturated hydrocarbon group or a cyclic unsaturated hydrocarbon group in place of a hydrogen atoms such as benzyl group and cumyl group. The number of carbon atoms in the cyclic unsaturated hydrocarbon groups is preferably 6 to 10.

Examples of the alkylene groups having 1 to 20 carbon atoms include methylene group, ethylene group, dimethylmethylene group (isopropylidene group), ethylmethylene group, methylethylene group and n-propylene group. The number of carbon atoms in the alkylene groups is preferably 1 to 6.

Examples of the arylene groups having 6 to 20 carbon atoms include o-phenylene group, m-phenylene group, p-phenylene group and 4,4'-biphenylylene group. The number of carbon atoms in the arylene groups is preferably 6 to 12.

Examples of the silicon-containing groups include groups resulting from the substitution of the $C_{1-20}$ hydrocarbon groups with a silicon atom in place of a carbon atom, specifically, alkylsilyl groups such as trimethylsilyl group, triethylsilyl group, t-butyldimethylsilyl group and triisopropylsilyl group, arylsilyl groups such as dimethylphenylsilyl group, methyldiphenylsilyl group and t-butyldiphenylsilyl group, and pentamethyldisilanyl group and trimethylsilylmethyl group. The number of carbon atoms in the alkylsilyl groups is preferably 1 to 10, and the number of carbon atoms in the arylsilyl groups is preferably 6 to 18.

Examples of the nitrogen-containing groups include amino group; groups resulting from the substitution of the aforementioned $C_{1-20}$ hydrocarbon groups or silicon-containing groups with a nitrogen atom in place of a =CH— structural unit, with a nitrogen atom bonded to a $C_{1-20}$ hydrocarbon group in place of a —$CH_2$— structural unit, or with a nitrile group or a nitrogen atom bonded to $C_{1-20}$ hydrocarbon groups in place of a —$CH_3$ structural unit such as dimethylamino group, diethylamino group, N-morpholinyl group, dimethylaminomethyl group, cyano group, pyrrolidinyl group, piperidinyl group and pyridinyl group; and N-morpholinyl group and nitro group. Preferred nitrogen-containing groups are dimethylamino group and N-morpholinyl group.

Examples of the oxygen-containing groups include hydroxyl group, and groups resulting from the substitution of the aforementioned $C_{1-20}$ hydrocarbon groups, silicon-containing groups or nitrogen-containing groups with an oxygen atom or a carbonyl group in place of a —$CH_2$— structural unit, or with an oxygen atom bonded to a $C_{1-20}$ hydrocarbon group in place of a —$CH_3$ structural unit such as methoxy group, ethoxy group, t-butoxy group, phenoxy group, trimethylsiloxy group, methoxyethoxy group, hydroxymethyl group, methoxymethyl group, ethoxymethyl group, t-butoxymethyl group, 1-hydroxyethyl group, 1-methoxyethyl group, 1-ethoxyethyl group, 2-hydroxyethyl group, 2-methoxyethyl group, 2-ethoxyethyl group, n-2-oxabutylene group, n-2-oxapentylene group, n-3-oxapentylene group, aldehyde group, acetyl group, propionyl group, benzoyl group, trimethylsilylcarbonyl group, carbamoyl group, methylaminocarbonyl group, carboxy group, methoxycarbonyl group, carboxymethyl group, ethocarboxymethyl group, carbamoylmethyl group, furanyl group and pyranyl group. A preferred oxygen-containing group is methoxy group.

Examples of the halogen atoms include Group XVII elements such as fluorine, chlorine, bromine and iodine.

Examples of the halogen-containing groups include groups resulting from the substitution of the aforementioned $C_{1-20}$ hydrocarbon groups, silicon-containing groups, nitrogen-containing groups or oxygen-containing groups with a halogen atom in place of a hydrogen atom such as trifluoromethyl group, tribromomethyl group, pentafluoroethyl group and pentafluorophenyl group.

Q is a halogen atom, a hydrocarbon group having 1 to 20 carbon atoms, an anionic ligand or a neutral ligand capable of coordination through a lone pair of electrons, and may be the same or different when plural.

The details of the halogen atoms and the hydrocarbon groups having 1 to 20 carbon atoms are as described above. When Q is a halogen atom, a chlorine atom is preferable. When Q is a hydrocarbon group having 1 to 20 carbon atoms, the number of carbon atoms in the hydrocarbon group is preferably 1 to 7.

Examples of the anionic ligands include alkoxy groups such as methoxy group, t-butoxy group and phenoxy group, carboxylate groups such as acetate and benzoate, and sulfonate groups such as mesylate and tosylate.

Examples of the neutral ligands capable of coordination through a lone pair of electrons include organophosphorus compounds such as trimethylphosphine, triethylphosphine, triphenylphosphine and diphenylmethylphosphine, and ether compounds such as tetrahydrofuran, diethyl ether, dioxane and 1,2-dimethoxyethane.

The letter j is an integer of 1 to 4, and preferably 2.

The letter n is an integer of 1 to 4, preferably 1 or 2, and more preferably 1.

($R^{13}$ and $R^{14}$)

$R^{13}$ and $R^{14}$ are each an atom or a substituent selected from the group consisting of a hydrogen atom, a hydrocarbon group having 1 to 20 carbon atoms, an aryl group, a substituted aryl group, a silicon-containing group, a nitrogen-containing group, an oxygen-containing group, a halogen atom and a halogen-containing group, and may be the same as or different from each other. $R^{13}$ and $R^{14}$ may be bonded together to form a ring or may not be bonded to each other.

The details of the hydrocarbon groups having 1 to 20 carbon atoms, the silicon-containing groups, the nitrogen-containing groups, the oxygen-containing groups, the halogen atoms and the halogen-containing groups are as described hereinabove.

Examples of the aryl groups include substituents derived from aromatic compounds such as phenyl group, 1-naphthyl group, 2-naphthyl group, anthracenyl group, phenanthrenyl group, tetracenyl group, chrysenyl group, pyrenyl group, indenyl group, azulenyl group, pyrrolyl group, pyridyl group, furanyl group and thiophenyl group. Some of these aryl groups overlap with some of the aforementioned cyclic unsaturated hydrocarbon groups having 3 to 20 carbon atoms. Preferred aryl groups are phenyl group and 2-naphthyl group.

Examples of the aromatic compounds include aromatic hydrocarbons and heterocyclic aromatic compounds such as benzene, naphthalene, anthracene, phenanthrene, tetracene, chrysene, pyrene, indene, azulene, pyrrole, pyridine, furan and thiophene.

Examples of the substituted aryl groups include groups resulting from the substitution of the above aryl groups with at least one substituent selected from the group consisting of hydrocarbon groups having 1 to 20 carbon atoms, aryl groups, silicon-containing groups, nitrogen-containing groups, oxygen-containing groups, halogen atoms and halogen-containing groups in place of one or more hydrogen atoms in the aryl groups. Specific examples include 3-methylphenyl group (m-tolyl group), 4-methylphenyl group (p-tolyl group), 3-ethylphenyl group, 4-ethylphenyl group, 3,4-dimethylphenyl group, 3,5-dimethylphenyl group, biphenylyl group, 4-(trimethylsilyl)phenyl group, 4-aminophenyl group, 4-(dimethylamino)phenyl group, 4-(diethylamino)phenyl group, 4-morpholinylphenyl group, 4-methoxyphenyl group, 4-ethoxyphenyl group, 4-phenoxyphenyl group, 3,4-dimethoxyphenyl group, 3,5-dimethoxyphenyl group, 3-methyl-4-methoxyphenyl group, 3,5-dimethyl-4-methoxyphenyl group, 3-(trifluoromethyl)phenyl group, 4-(trifluoromethyl)phenyl group, 3-chlorophenyl group, 4-chlorophenyl group, 3-fluorophenyl group, 4-fluorophenyl group, 5-methylnaphthyl group and 2-(6-methyl)pyridyl group. Some of these substituted aryl groups overlap with some of the aforementioned cyclic unsaturated hydrocarbon groups having 3 to 20 carbon atoms.

In the bridged metallocene compound (A) represented by the above formula [I], n is preferably 1. Such bridged metallocene compounds (hereinafter, also written as the "bridged metallocene compounds (A-1)") are represented by the following general formula [II].

[Chem. 3]

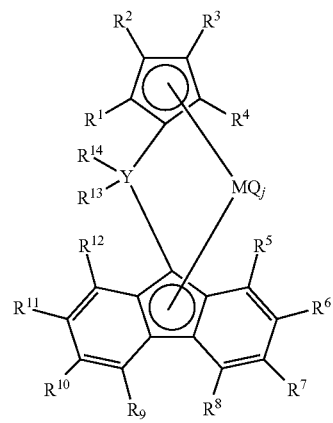

[II]

In the formula [II], Y, M, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, Q and j are as defined and described hereinabove.

The bridged metallocene compound (A-1) may be produced through simplified steps at low production cost as compared to the compounds of the formula [I] in which n is an integer of 2 to 4. Thus, the use of such a bridged metallocene compound (A-1) is advantageous in that the costs associated with the production of ethylene/α-olefin copolymers are reduced.

In the bridged metallocene compound (A-1) represented by the formula [II] above, it is preferable that $R^1$, $R^2$, $R^3$ and $R^4$ be all hydrogen atoms. Such bridged metallocene compounds (hereinafter, also written as the "bridged metallocene compounds (A-2)") are represented by the following general formula [III].

[Chem. 4]

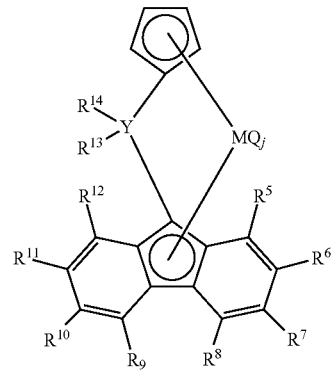

[III]

In the formula [III], Y, M, $R^5$, $R^6$, $R^7$, $R^8$, $R^9$, $R^{10}$, $R^{11}$, $R^{12}$, $R^{13}$, $R^{14}$, Q and j are as defined and described hereinabove.

The bridged metallocene compound (A-2) may be produced through simplified steps at low production cost as compared to the compounds of the formula [I] in which one or more of $R^1$, $R^2$, $R^3$ and $R^4$ are substituents other than hydrogen atoms. Thus, the use of such a bridged metallocene compound (A-2) is advantageous in that the costs for the production of ethylene/α-olefin copolymers are reduced. In contrast to a general knowledge that the randomness of ethylene/α-olefin copolymers is decreased at high polymerization temperatures, the olefin polymerization catalyst including the bridged metallocene compound (A-2) can catalyze the copolymerization of ethylene with one or more monomers selected from $C_{3-20}$ α-olefins so as to advantageously afford an ethylene/α-olefin copolymer with high randomness even at a high polymerization temperature.

In the bridged metallocene compound (A-2) represented by the formula [III] above, it is preferable that one of $R^{13}$ and $R^{14}$ be an aryl group or a substituted aryl group. Such a bridged metallocene compound (A-3) provides an advantage that the number of double bonds in the obtainable ethylene/α-olefin copolymer is small as compared to when $R^{13}$ and $R^{14}$ are both substituents other than aryl groups and substituted aryl groups.

The bridged metallocene compound (A-3) is more preferably such that one of $R^{13}$ and $R^{14}$ is an aryl group or a substituted aryl group and the other is an alkyl group having 1 to 20 carbon atoms, and is particularly preferably such that one of $R^{13}$ and $R^{14}$ is an aryl group or a substituted aryl group and the other is a methyl group. Such a bridged metallocene compound (hereinafter, also written as the "bridged metallocene compound (A-4)") provides advantages that the balance between the polymerization activity and the number of double bonds in the obtainable ethylene/α-olefin copolymer is excellent and the use of the bridged metallocene compound allows for the reduction of costs associated with the production of ethylene/α-olefin copolymers as compared to when $R^{13}$ and $R^{14}$ are both aryl groups or substituted aryl groups.

When polymerization is performed at a given total pressure in a polymerizer and at a given temperature, increasing the hydrogen partial pressure by the introduction of hydrogen is accompanied by a decrease in the partial pressures of olefin monomers to be polymerized and consequently the polymerization rate is disadvantageously depressed particularly in sections having a high hydrogen partial pressure. Because the total pressure acceptable inside a polymerization reactor is limited for design reasons, any excessive introduction of hydrogen during the production of olefin polymers, in particular, as required for the production of olefin polymers having a low molecular weight, significantly decreases the olefin partial pressure and possibly results in a decrease in polymerization activity. In contrast, the use of the bridged metallocene compound (A-4) allows the inventive ethylene/α-olefin copolymer to be produced with a reduced amount of hydrogen introduced into the polymerization reactor and thus with an enhanced polymerization activity as compared to when the bridged metallocene compound (A-3) is used, thereby providing an advantage that the costs associated with the production of ethylene/α-olefin copolymers are reduced.

In the bridged metallocene compound (A-4), $R^6$ and $R^{11}$ are preferably each an alkyl group having 1 to 20 carbon atoms or an alkylene group having 1 to 20 carbon atoms and may be bonded to any of the adjacent substituents to form a ring. Such a bridged metallocene compound (hereinafter, also written as the "bridged metallocene compound (A-5)") may be produced through simplified steps at low production cost as compared to the compounds in which $R^6$ and $R^{11}$ are substituents other than alkyl groups having 1 to 20 carbon atoms and alkylene groups having 1 to 20 carbon atoms. Thus, the use of such a bridged metallocene compound (A-5) is advantageous in that the costs associated with the production of ethylene/α-olefin copolymers are reduced.

In the bridged metallocene compound (A) represented by the general formula [I], the bridged metallocene compound (A-1) represented by the general formula [II], the bridged metallocene compound (A-2) represented by the general formula [III], and the bridged metallocene compounds (A-3), (A-4) and (A-5), it is more preferable that M be a zirconium atom. When M is a zirconium atom, the olefin polymerization catalyst including such a bridged metallocene compound can catalyze the copolymerization of ethylene with one or more monomers selected from $C_{3-20}$ α-olefins with high polymerization activity as compared to when M is a titanium atom or a hafnium atom, thus providing an advantage that the costs associated with the production of ethylene/α-olefin copolymers are reduced.

(Some Examples of Bridged Metallocene Compounds (A))

Examples of the bridged metallocene compounds (A) include

[dimethylmethylene($\eta^5$-cyclopentadienyl)($\eta^5$-fluorenyl)]zirconium dichloride,

[dimethylmethylene($\eta^5$-cyclopentadienyl)($\eta^5$-2,7-di-t-butylfluorenyl)]zirconium dichloride,

[dimethylmethylene($\eta^5$-cyclopentadienyl)($\eta^5$-3,6-di-t-butylfluorenyl)]zirconium dichloride,

[dimethylmethylene($\eta^5$-cyclopentadienyl)($\eta^5$-octamethyloctahydrodibenzofluorenyl)]zirconium dichloride,

[dimethylmethylene($\eta^5$-cyclopentadienyl)($\eta^5$-tetramethyloctahydrodibenzofluorenyl)]zirconium dichloride,

[cyclohexylidene($\eta^5$-cyclopentadienyl)($\eta^5$-fluorenyl)]zirconium dichloride,

[cyclohexylidene($\eta^5$-cyclopentadienyl)($\eta^5$-2,7-di-t-butylfluorenyl)]zirconium dichloride,

[cyclohexylidene($\eta^5$-cyclopentadienyl)($\eta^5$-3,6-di-t-butylfluorenyl)]zirconium dichloride,

[cyclohexylidene($\eta^5$-cyclopentadienyl)($\eta^5$-octamethyloctahydrodibenzofluorenyl)]zirconium dichloride,

[cyclohexylidene($\eta^5$-cyclopentadienyl)($\eta^5$-tetramethyloctahydrodibenzofluorenyl)]zirconium dichloride,

[diphenylmethylene($\eta^5$-cyclopentadienyl)($\eta^5$-fluorenyl)]zirconium dichloride,

[diphenylmethylene($\eta^5$-cyclopentadienyl)($\eta^5$-2,7-di-t-butylfluorenyl)]zirconium dichloride, diphenylmethylene($\eta^5$-2-methyl-4-t-butylcyclopentadienyl)($\eta^5$-2,7-di-t-butylfluorenyl)]zirconium dichloride,

[diphenylmethylene($\eta^5$-cyclopentadienyl)($\eta^5$-3,6-di-t-butylfluorenyl)]zirconium dichloride,

[diphenylmethylene($\eta^5$-cyclopentadienyl)($\eta^5$-octamethyloctahydrodibenzofluorenyl)]zirconium dichloride, diphenylmethylene[$\eta^5$-(2-methyl-4-i-propylcyclopentadienyl)]($\eta^5$-octamethyloctahydrodibenzofluorenyl)]zirconium dichloride,

[diphenylmethylene($\eta^5$-cyclopentadienyl)($\eta^5$-tetramethyloctahydrodibenzofluorenyl)]zirconium dichloride,

[methylphenylmethylene($\eta^5$-cyclopentadienyl)($\eta^5$-fluorenyl)]zirconium dichloride,

[methylphenylmethylene($\eta^5$-cyclopentadienyl)($\eta^5$-2,7-di-t-butylfluorenyl)]zirconium dichloride,

[methylphenylmethylene($\eta^5$-cyclopentadienyl)($\eta^5$-3,6-di-t-butylfluorenyl)]zirconium dichloride,

[methylphenylmethylene($\eta^5$-cyclopentadienyl)($\eta^5$-octamethyloctahydrodibenzofluorenyl)]zirconium dichloride,

[methylphenylmethylene($\eta^5$-cyclopentadienyl)($\eta^5$-tetramethyloctahydrodibenzofluorenyl)]zirconium dichloride,

[methyl(3-methylphenyl)methylene($\eta^5$-cyclopentadienyl)($\eta^5$-fluorenyl)]zirconium dichloride,

[methyl(3-methylphenyl)methylene($\eta^5$-cyclopentadienyl)($\eta^5$-2,7-di-t-butylfluorenyl)]zirconium dichloride,
[methyl(3-methylphenyl)methylene($\eta^5$-cyclopentadienyl)($\eta^5$-3,6-di-t-butylfluorenyl)]zirconium dichloride,
[methyl(3-methylphenyl)methylene($\eta^5$-cyclopentadienyl)($\eta^5$-octamethyloctahydrodibenzofluorenyl)]zirconium dichloride,
[methyl(3-methylphenyl)methylene($\eta^5$-cyclopentadienyl)($\eta^5$-tetramethyloctahydrodibenzofluorenyl)]zirconium dichloride,
[diphenylsilylene($\eta^5$-cyclopentadienyl)($\eta^5$-fluorenyl)]zirconium dichloride,
[diphenylsilylene($\eta^5$-cyclopentadienyl)($\eta^5$-2,7-di-t-butylfluorenyl)]zirconium dichloride,
[diphenylsilylene($\eta^5$-cyclopentadienyl)($\eta^5$-3,6-di-t-butylfluorenyl)]zirconium dichloride,
[diphenylsilylene($\eta^5$-cyclopentadienyl)($\eta^5$-octamethyloctahydrodibenzofluorenyl)]zirconium dichloride,
[diphenylsilylene($\eta^5$-cyclopentadienyl)($\eta^5$-tetramethyloctahydrodibenzofluorenyl)]zirconium dichloride,
[bis(3-methylphenyl)silylene($\eta^5$-cyclopentadienyl)($\eta^5$-fluorenyl)]zirconium dichloride,
[bis(3-methylphenyl)silylene($\eta^5$-cyclopentadienyl)($\eta^5$-2,7-di-t-butylfluorenyl)]zirconium dichloride,
[bis(3-methylphenyl)silylene($\eta^5$-cyclopentadienyl)($\eta^5$-3,6-di-t-butylfluorenyl)]zirconium dichloride,
[bis(3-methylphenyl)silylene($\eta^5$-cyclopentadienyl)($\eta^5$-octamethyloctahydrodibenzofluorenyl)]zirconium dichloride,
[bis(3-methylphenyl)silylene($\eta^5$-cyclopentadienyl)($\eta^5$-tetramethyloctahydrodibenzofluorenyl)]zirconium dichloride,
[dicyclohexylsilylene($\eta^5$-cyclopentadienyl)($\eta^5$-fluorenyl)]zirconium dichloride,
[dicyclohexylsilylene($\eta^5$-cyclopentadienyl)($\eta^5$-2,7-di-t-butylfluorenyl)]zirconium dichloride,
[dicyclohexylsilylene($\eta^5$-cyclopentadienyl)($\eta^5$-3,6-di-t-butylfluorenyl)]zirconium dichloride,
[dicyclohexylsilylene($\eta^5$-cyclopentadienyl)($\eta^5$-octamethyloctahydrodibenzofluorenyl)]zirconium dichloride,
[dicyclohexylsilylene($\eta^5$-cyclopentadienyl)($\eta^5$-tetramethyloctahydrodibenzofluorenyl)]zirconium dichloride,
[ethylene($\eta^5$-cyclopentadienyl)($\eta^5$-fluorenyl)]zirconium dichloride,
[ethylene($\eta^5$-cyclopentadienyl)($\eta^5$-2,7-di-t-butylfluorenyl)]zirconium dichloride,
[ethylene($\eta^5$-cyclopentadienyl)($\eta^5$-3,6-di-t-butylfluorenyl)]zirconium dichloride,
[ethylene($\eta^5$-cyclopentadienyl)($\eta^5$-octamethyloctahydrodibenzofluorenyl)]zirconium dichloride and
[ethylene($\eta^5$-cyclopentadienyl)($\eta^5$-tetramethyloctahydrodibenzofluorenyl)]zirconium dichloride.

Examples further include compounds corresponding to the above compounds except that the zirconium atom is replaced by a hafnium atom or except that the chloro ligand is replaced by a methyl group. The bridged metallocene compounds (A) are not limited to the examples described above. In the bridged metallocene compounds (A) described above, $\eta^5$-tetramethyloctahydrodibenzofluorenyl indicates 4,4,7,7-tetramethyl-(5a,5b,11a,12,12a-$\eta^5$)-1,2,3,4,7,8,9,10-octahydrodibenzo[b,h]fluorenyl group, and $\eta^5$-octamethyloctahydrodibenzofluorenyl indicates 1,1,4,4,7,7,10,10-octamethyl-(5a,5b,11a,12,12a-$\eta^5$)-1,2,3,4,7,8,9,10-octahydrodibenzo[b,h]fluorenyl group.

<Compound (B)>

The polymerization catalyst used in the invention contains the bridged metallocene compound (A) and at least one compound (B) that is selected from organometallic compounds (B-1), organoaluminum oxy compounds (B-2) and compounds (B-3) capable of reacting with the bridged metallocene compound (A) to form an ion pair.

As the organometallic compound (B-1), specifically such organometallic compounds in Groups 1, 2, 12 and 13 of the periodic table as mentioned below are used.

An organoaluminum compound represented by the formula:

(B-1a) general formula:

wherein $R^a$ and $R^b$, each of which may be the same or different, are a hydrocarbon group having 1 to 15 carbon atoms, preferably a hydrocarbon group having 1 to 4 carbon atoms; X is a halogen atom; m, n, p and q are numbers defined as $0<m\le3$, $0\le n<3$, $0\le p<3$, $0\le q<3$; and $m+n+p+q=3$.

Examples of such a compound include:
tri-n-alkylaluminums such as trimethylaluminum, triethylaluminum, tri-n-butylaluminum, tri-n-hexylaluminum and tri-n-octylaluminum;
tri-branched-alkylaluminums such as triisopropylaluminum, tri isobutylaluminum, trisec-butylaluminum, tri-t-butylaluminum, tri-2-methylbutylaluminum, tri-3-methylhexylaluminum and tri-2-ethylhexylaluminum;
tricycloalkylaluminums such as tricyclohexylaluminum and tricyclooctylaluminum;
triarylaluminums such as triphenylaluminum and tri(4-methylphenyl)aluminum;
dialkylaluminumhydrides such as diisopropylaluminumhydride and diisobutylaluminumhydride;
alkenylaluminum such as isoprenylaluminum represented by the general formula $(i-C_4H_9)_xAl_y(C_5H_{10})_z$, wherein x, y and z are positive numbers, and $z\ge 2$ x);
alkylaluminumalkoxides such as isobutylaluminummethoxide and isobutylaluminumethoxide;
dialkylaluminumalkoxides such as dimethylaluminummethoxide, diethylaluminumethoxide and dibutylaluminumbutoxide;
alkylaluminumsesquialkoxides such as ethylaluminumsesquiethoxide and butylaluminumsesquibutoxide;
partially alcoxylated alkylaluminums having an average composition represented by the general formula $R^a_{2.5}Al(OR^b)_{0.5}$ and the like;
alkylaluminumaryloxides such as diethylaluminumphenoxide and diethylaluminum(2,6-di-t-butyl-4-methylphenoxide);
dialkylaluminumhalides such as dimethylaluminumchloride, diethylaluminumchloride, dibutylaluminumchloride, diethylaluminumbromide and diisobutylaluminumchloride;
alkylaluminumsesquihalides such as ethylaluminumsesquichloride, butylaluminumsesquichloride and ethylaluminumsesquibromide;
partially halogenated alkylaluminums including alkylaluminumdihalide such as ethylaluminumdichloride;
dialkylaluminumhydrides such as diethylaluminumhydride and dibutylaluminumhydride;
alkylaluminumdihydrides such as ethylaluminumdihydride and propylaluminumdihydride, and other partially hydrogenate alkylaluminum, and
partially alcoxylated and halogenated alkylaluminums such as ethylaluminumethoxychloride, butylaluminumbutoxychloride and ethylaluminumethoxybromide.

Compounds similar to the compounds represented by the general formula $R^a_mAl(OR^b)_nH_pX_q$ can also be used, examples of which compounds include, for example, an organoaluminum compound wherein two or more aluminum compounds are bound via a nitrogen atom. Examples of such a compound specifically include $(C_2H_5)_2AlN(C_2H_5)Al(C_2H_5)_2$, and the like.

A complex alkylated compound of a metal of Group 1 of the periodic table and aluminum, represented by the formula:

 (B-1b) general formula:

wherein $M^2$ is Li, Na or K; and $R^a$ is a hydrocarbon group having 1 to 15 carbon atoms, preferably a hydrocarbon group having 1 to 4 carbon atoms.

Examples of such a compound include $LiAl(C_2H_5)_4$, $LiAl(C_7H_{15})_4$, and the like.

A dialkyl compound of a metal of Group 2 or 12 of the periodic table, represented by the formula:

 (B-1c) general formula:

wherein $R^a$ and $R^b$, each of which may be the same or different, are a hydrocarbon group having 1 to 15 carbon atoms, preferably a hydrocarbon group having 1 to 4 carbon atoms; and $M^3$ is Mg, Zn or Cd.

As the organoaluminum oxy compound (B-2), a conventionally known aluminoxane can be used as it is. Specifically, examples of such a compound include compounds represented by the general formula [IV] and/or the general formula [V].

[Chem. 5]

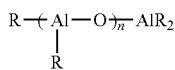 [IV]

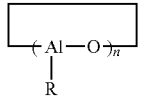 [V]

In the formulas [IV] and [V], R is a hydrocarbon group having 1 to 10 carbon atoms and n is an integer of 2 or more.

In particular, methylaluminoxane wherein R is a methyl group and wherein n is 3 or more, preferably 10 or more, is used. These aluminoxanes may have a slight amount of organoaluminum compounds mixed thereinto.

When, in the present invention, ethylene and an α-olefin having three or more carbon atoms are copolymerized at high temperature, benzene-insoluble organoaluminum oxy compounds such as those exemplified in JP-A No. H02-78687 may also be applied. In addition, organoaluminum oxy compounds described in JP-A No. H02-167305, aluminoxanes having two or more kinds of alkyl groups described in JP-A No. H02-24701 and JP-A No. H03-103407, and the like may also be preferably utilized. The "benzene-insoluble organoaluminum oxy compound", which may be used in the present invention, has an Al content dissolved in benzene at 60° C. typically at 10% or less, preferably 5% or less, particularly preferably 2% or less based on the conversion to Al atoms, and is an insoluble or poorly-soluble compound to benzene.

Examples of the organoaluminum oxy compound (B-2) also include a modified methylaluminoxane such as the one represented by the following general formula [VI].

[Chem. 6]

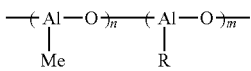 [VI]

In the formula [VI], R is a hydrocarbon group having 1 to 10 carbon atoms and each of m and n is independently an integer of 2 or more.

This modified methylaluminoxane is prepared using trimethylaluminum and an alkylaluminum other than trimethylaluminum. Such a compound is generally referred to as MMAO. Such MMAO can be prepared by a method described in US U.S. Pat. No. 4,960,878 and U.S. Pat. No. 5,041,584. A compound which is prepared using trimethylaluminum and triisobutylaluminum wherein R is an isobutyl group is also commercially available under the name of MMAO, TMAO, and the like from Tosoh Finechem Corporation. Such MMAO is an aluminoxane whose solubility and preservation stability with respect to various solvents have been improved, and is soluble in an aliphatic hydrocarbon or an alicyclic hydrocarbon, specifically unlike the compounds which are insoluble or poorly-soluble to benzene among the compounds represented by the formulas [IV] and [V].

Further, examples of the organoaluminum oxy compound (B-2) also include boron-containing organoaluminum oxy compounds represented by the general formula [VII].

[Chem. 7]

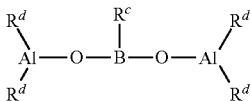 [VII]

In the formula [VII], $R^c$ is a hydrocarbon group having 1 to 10 carbon atoms; and $R^d$ may each be the same or different and is a hydrogen atom, a halogen atom or a hydrocarbon group having 1 to 10 carbon atoms.

Examples of the compounds (B-3) capable of reacting with the bridged metallocene compound (A) to form an ion pair (hereinafter may be referred to as "ionized ionic compound" or simply "ionic compound" for short) include Lewis acids, ionic compounds, borane compounds and carborane compounds described in JP-A No. H01-501950, JP-A No. H01-502036, JP-A No. H03-179005, JP-A No. H03-179006, JP-A No. H03-207703, JP-A No. H03-207704, U.S. Pat. No. 5,321,106, and so on. Further examples include heteropoly compounds and isopoly compounds.

The ionized ionic compounds preferably used in the present invention are boron compounds represented by the following general formula [VIII].

[Chem. 8]

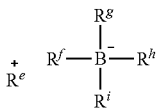 [VIII]

In the formula [VIII], $R^{e+}$ is $H^+$, carbenium cation, oxonium cation, ammonium cation, phosphonium cation, cycloheptyltrienyl cation, ferrocenium cation having a transition metal, or the like. $R^f$ to $R^i$ may be the same as or different from each other and are each a substituent selected from hydrocarbon groups having 1 to 20 carbon atoms, silicon-containing groups, nitrogen-containing groups, oxygen-containing groups, halogen atoms and halogen-containing groups, and preferably a substituted aryl group.

Specific examples of the carbenium cations include tri-substituted carbenium cations, such as triphenylcarbenium cation, tris(4-methylphenyl)carbenium cation and tris(3,5-dimethylphenyl)carbenium cation.

Specific examples of the ammonium cations include trialkyl-substituted ammonium cations such as trimethylammonium cation, triethylammonium cation, tri(n-propyl)ammonium cation, triisopropylammonium cation, tri(n-butyl)ammonium cation and triisobutylammonium cation; N,N-dialkylanilinium cations such as N,N-dimethylanilinium cation, N,N-diethylanilinium cation and N,N-2,4,6-pentamethylanilinium cation; and dialkylammonium cations such as diisopropylammonium cation and dicyclohexylammonium cation.

Specific examples of the phosphonium cations include triarylphosphonium cations such as triphenylphosphonium cation, tris(4-methylphenyl)phosphonium cation and tris(3,5-dimethylphenyl)phosphonium cation.

Of the above specific examples, carbenium cation, ammonium cation or the like is preferable as $R^{e+}$, and in particular, triphenylcarbenium cation, N,N-dimethylanilinium cation or N,N-diethylanilium cation is preferable.

Examples of compounds containing carbenium cation, among the ionized ionic compounds preferably used in the present invention, include triphenylcarbenium tetraphenylborate, triphenylcarbenium tetrakis(pentafluorophenyl)borate, triphenylcarbenium tetrakis[3,5-di-(trifluoromethyl)phenyl]borate, tris(4-methylphenyl)carbenium tetrakis(pentafluorophenyl)borate and tris(3,5-dimethylphenyl)carbenium tetrakis(pentafluorophenyl)borate.

Examples of compounds containing a trialkyl-substituted ammonium cation, among the ionized ionic compounds preferably used in the present invention, include triethylammonium tetraphenylborate, tripropylammonium tetraphenylborate, tri(n-butyl)ammonium tetraphenylborate, trimethylammonium tetrakis(4-methylphenyl)borate, trimethylammonium tetrakis(2-methylphenyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis[4-(trifluoromethyl)phenyl]borate, tri(n-butyl)ammonium tetrakis[3,5-di(trifluoromethyl)phenyl]borate, tri(n-butyl)ammonium tetrakis(2-methylphenyl)borate, dioctadecylmethylammonium tetraphenylborate, dioctadecylmethylammonium tetrakis(4-methylphenyl)borate, dioctadecylmethylammonium tetrakis(4-methylphenyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis[4-(trifluoromethyl)phenyl]borate, dioctadecylmethylammonium tetrakis[3,5-di(trifluoromethyl)phenyl]borate and dioctadecylmethylammonium.

Examples of compounds containing a N,N-dialkylanilinium cation, among the ionized ionic compounds preferably used in the present invention, include N,N-dimethylanilinium tetraphenylborate, N,N-dimethylanilinium tetrakis(pentafluorophenyl)borate, N,N-dimethylanilinium tetrakis[3,5-di(trifluoromethyl)phenyl]borate, N,N-diethylanilinium tetraphenylborate, N,N-diethylanilinium tetrakis(pentafluorophenyl)borate, N,N-diethylanilinium tetrakis[3,5-di(trifluoromethyl)phenyl]borate, N,N-2,4,6-pentamethylanilinium tetraphenylborate and N,N-2,4,6-pentamethylanilinium tetrakis(pentafluorophenyl)borate.

Examples of compounds containing a dialkylammonium cation, among the ionized ionic compounds preferably used in the present invention, include di-n-propylammonium tetrakis(pentafluorophenyl)borate and dicyclohexylammonium tetraphenylborate.

In addition, ionic compounds disclosed (see JP-A No. 2004-51676, for example) by the present applicant are also employable without any restriction.

The ionic compounds (B-3) may be used singly, or two or more kinds thereof may be mixed and used.

As the organometallic compounds (B-1), preferable are trimethylaluminum, triethylaluminum and triisobutylaluminum, which are easily obtainable because of commercial products. Of these, triisobutylaluminum, which is easy to handle, is particularly preferable.

As the organoaluminum oxy compound (B-2), methylaluminoxane, and MMAO that is prepared using trimethylaluminum and triisobutylaluminum, are preferable, since they are commercially available and easily available. Among these, MMAO, whose solubility and preservation stability to various solvents have been improved, is particularly preferable.

As the ionic compound (B-3), triphenylcarbenium tetrakis(pentafluorophenyl)borate and N,N-dimethylanilinium tetrakis(pentafluorophenyl)borate are preferable because they are easily obtained as commercially available items and greatly contributory to improvement in polymerization activity.

As the compound (B), the ionic compound (B-3) is preferable. When ethylene and at least one monomer selected from α-olefins having 3 to 20 carbon atoms are copolymerized in the presence of the olefin polymerization catalyst containing the bridged metallocene compound (A) represented by the formula [I] and the ionic compound (B-3), an advantage is obtained that the ethylene/α-olefin copolymer is produced at high polymerization activity and at a lower cost. From the viewpoint of greatly improving polymerization activity, a combination of triisobutylaluminum and triphenylcarbenium tetrakis(pentafluorophenyl)borate and a combination of triisobutylaluminum and N,N-dimethylanilinium tetrakis(pentafluorophenyl)borate are particularly preferable.

<Carrier (C)>

In the present invention, a carrier (C) may be used as a constituent of the olefin polymerization catalyst, when needed.

The carrier (C) that may be used in the present invention is an inorganic or organic compound and is a granular or fine particulate solid. Of such inorganic compounds, porous oxides, inorganic chlorides, clays, clay minerals or ion-exchanging layered compounds are preferable.

As the porous oxides, $SiO_2$, $Al_2O_3$, MgO, ZrO, $TiO_2$, $B_2O_3$, CaO, ZnO, BaO, $ThO_2$ and the like, and composites or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO, can be specifically used. Of these, porous oxides containing $SiO_2$ and/or $Al_2O_3$ as a main component are preferable. Such porous oxides differ in their properties depending upon the type and the production process, but a carrier preferably used in the present invention has a particle diameter of 0.5 to 300 µm, preferably 1.0 to 200 µm, a specific surface area of 50 to 1000 m$^2$/g, preferably 100 to 700 m$^2$/g, and a pore volume of 0.3 to 3.0 cm$^3$/g. Such a carrier is used after it is calcined at 100 to 1000° C., preferably 150 to 700° C., when needed.

As the inorganic chlorides, MgCl$_2$, MgBr$_2$, MnCl$_2$, MnBr$_2$ or the like is used. The inorganic chloride may be used as it is, or may be used after pulverized by a ball mill or an oscillating mill. Further, fine particles obtained by dissolving an inorganic chloride in a solvent such as an alcohol and then precipitating it using a precipitant may be used.

The clay usually comprises a clay mineral that is a main component. The ion-exchanging layered compound is a compound having a crystal structure in which constituent planes lie one upon another in parallel and are bonded to each other by ionic bonding or the like with a weak bonding force, and the ions contained are exchangeable. Most of the clay minerals are ion-exchanging layered compounds. These clay, clay mineral and ion-exchanging layered compound are not limited to natural ones, and artificial synthetic products can be also used. Examples of the clays, the clay minerals and the ion-exchanging layered compounds include clays, clay minerals and ionic crystalline compounds having layered crystal structures such as hexagonal closest packing type, antimony type, CdCl$_2$ type and CdI$_2$ type. Examples of such clays and clay minerals include kaolin, bentonite, Kibushi clay, gairome clay, allophane, hisingerite, pyrophyllite, mica group, montmorillonite, vermiculite, chlorite group, palygorskite, kaolinite, nacrite, dickite and halloysite. Examples of the ion-exchanging layered compounds include crystalline acidic salts of polyvalent metals, such as α-Zr(HAsO$_4$)$_2$.H$_2$O, α-Zr(HPO$_4$)$_2$, α-Zr(KPO$_4$)$_2$.3H$_2$O, α-Ti(HPO$_4$)$_2$, α-Ti(HAsO$_4$)$_2$.H$_2$O, α-Sn(HPO$_4$)$_2$.H$_2$O, γ-Zr(HPO$_4$)$_2$, γ-Ti(HPO$_4$)$_2$ and γ-Ti(NH$_4$PO$_4$)$_2$.H$_2$O. It is also preferable to subject the clays and the clay minerals for use in the present invention to chemical treatment. As the chemical treatment, any of surface treatments to remove impurities adhering to a surface and treatments having influence on the crystal structure of clay can be used. Specific examples of the chemical treatments include acid treatment, alkali treatment, salts treatment and organic substance treatment.

The ion-exchanging layered compound may be a layered compound in which spacing between layers has been enlarged by exchanging exchangeable ions present between layers with other large bulky ions. Such a bulky ion plays a pillar-like role to support a layer structure and is usually called pillar. Introduction of another substance (guest compound) between layers of a layered compound as above is referred to as "intercalation". Examples of the guest compounds include cationic inorganic compounds such as TiCl$_4$ and ZrCl$_4$, metallic alkoxides such as Ti(OR)$_4$, Zr(OR)$_4$, PO(OR)$_3$ and B(OR)$_3$ (R is a hydrocarbon group or the like), and metallic hydroxide ions such as [Al$_{13}$O$_4$ (OH)$_{24}$]$^{7+}$, [Zr$_4$ (OH)$_{14}$]$^{2+}$ and [Fe$_3$O(OCOCH$_3$)$_6$]$^+$. These compounds are used singly or in combination of two or more kinds. During intercalation of these compounds, polymerization products obtained by subjecting metallic alkoxides such as Si(OR)$_4$, Al(OR)$_3$ and Ge(OR)$_4$ (R is a hydrocarbon group or the like) to hydrolysis polycondensation, colloidal inorganic compounds such as SiO$_2$, etc. may be allowed to coexist. As the pillar, an oxide formed by intercalating the above metallic hydroxide ion between layers and then performing thermal dehydration, or the like can be mentioned.

Of the above carriers, preferable are clays and clay minerals, and particularly preferable are montmorillonite, vermiculite, pectolite, teniorite and synthetic mica.

As the organic compound functioning as the carrier (C), a granular or fine particulate solid having a particle diameter of 0.5 to 300 µm can be mentioned. Specific examples thereof include (co)polymers produced using, as a main component, an α-olefin having 2 to 14 carbon atoms such as ethylene, propylene, 1-butene and 4-methyl-1-pentene; (co) polymers produced using, as a main component, vinylcyclohexane or styrene; and modified products thereof.

⟨Copolymerization of Ethylene and α-Olefin Using Olefin Polymerization Catalyst⟩

The copolymer production method of the invention is characterized in that the method includes a step of copolymerizing ethylene and an α-olefin having 3 to 20 carbon atoms in the presence of the olefin polymerization catalyst described above.

Examples of the α-olefins used in the invention include linear or branched α-olefins having 3 to 20 carbon atoms such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene and vinylcyclohexane. Preferred α-olefins are linear or branched α-olefins having 3 to 10 carbon atoms. Propylene, 1-butene, 1-hexene and 1-octene are more preferable. Propylene is most preferable in terms of the shear stability of lubricating oils including the obtainable copolymer. The α-olefins may be used singly, or two or more may be used in combination.

The polymerization may be performed in the presence of at least one selected from polar group-containing monomers, aromatic vinyl compounds and cycloolefins in the reaction system. Such monomers may be used in an amount of, for example, not more than 20 parts by mass, and preferably not more than 10 parts by mass with respect to 100 parts by mass of the total of ethylene and the α-olefin(s) having 3 to 20 carbon atoms.

Examples of the polar group-containing monomers include α,β-unsaturated carboxylic acids such as acrylic acid, methacrylic acid, fumaric acid and maleic anhydride; metal salts of these acids such as sodium salts; α,β-unsaturated carboxylate esters such as methyl acrylate, ethyl acrylate, n-propyl acrylate, methyl methacrylate and ethyl methacrylate; vinyl esters such as vinyl acetate and vinyl propionate; and unsaturated glycidyls such as glycidyl acrylate and glycidyl methacrylate.

Examples of the aromatic vinyl compounds include styrene, o-methylstyrene, m-methylstyrene, p-methylstyrene, o,p-dimethylstyrene, methoxystyrene, vinylbenzoic acid, methyl vinylbenzoate, vinylbenzyl acetate, hydroxystyrene, p-chlorostyrene, divinylbenzene, a-methylstyrene and allylbenzene.

Examples of the cycloolefins include those cycloolefins having 3 to 30, preferably 3 to 20 carbon atoms such as cyclopentene, cycloheptene, norbornene, 5-methyl-2-norbornene and tetracyclododecene.

In an embodiment of the copolymer production method of the invention, ethylene and an α-olefin having 3 to 20 carbon atoms are copolymerized in the presence of the aforementioned olefin polymerization catalyst so as to give a copolymer containing 30 to 70 mol % of ethylene-derived structural units relative to the total of the structural units derived from the respective monomers in the polymer taken as 100 mol % (the total of ethylene-derived structural units and α-olefin-derived structural units is taken as 100 mol %).

The molar ratio of the structural units derived from ethylene to the structural units derived from the $C_{3-20}$ α-olefin may be controlled to fall in the above range by controlling the ratio of the raw material monomers. When ethylene is copolymerized with one olefin selected from α-olefins having 3 to 20 carbon atoms, ethylene and the $C_{3-20}$ α-olefin are usually fed in an ethylene:α-olefin molar ratio of 10:90 to 99.9:0.1, preferably 30:70 to 99.9:0.1, and more preferably 50:50 to 99.9:0.1.

Because the olefin polymerization catalyst can afford ethylene/α-olefin copolymers having high randomness, the polymerization method may be performed at a high polymerization temperature. That is, the use of the olefin polymerization catalyst makes it possible to prevent the decrease in the randomness of ethylene/α-olefin copolymers formed at high polymerization temperatures. In solution polymerization, a polymer solution including the ethylene/α-olefin copolymer formed exhibits a low viscosity at a high temperature and thus the concentration of the ethylene/α-olefin copolymer in the polymerizer can be increased as compared to when the polymerization is performed at a lower temperature. As a result, the productivity per polymerizer is enhanced. While the copolymerization of ethylene with α-olefins in the invention may be carried out by any of liquid-phase polymerization processes such as solution polymerization and suspension polymerization (slurry polymerization) and gas-phase polymerization processes, solution polymerization is particularly preferable because the most advantage can be taken of the effects of the invention.

The components of the olefin polymerization catalyst may be used in any manner and may be added in any order without limitation. At least two or more of the components for the catalyst may be placed in contact together beforehand.

The bridged metallocene compound (A) (hereinafter, also written as the "component (A)") is usually used in an amount of $10^{-9}$ to $10^{-1}$ mol, and preferably $10^{-8}$ to $10^{-2}$ mol per 1 L of the reaction volume.

The organometallic compound (B-1) (hereinafter, also written as the "component (B-1)") is usually used in such an amount that the molar ratio of the component (B-1) to the transition metal atoms (M) in the component (A) [(B-1)/M] is 0.01 to 50000, and preferably 0.05 to 10000.

The organoaluminum oxy compound (B-2) (hereinafter, also written as the "component (B-2)") is usually used in such an amount that the molar ratio of the aluminum atoms in the component (B-2) to the transition metal atoms (M) in the component (A) [(B-2)/M] is 10 to 5000, and preferably 20 to 2000.

The ionic compound (B-3) (hereinafter, also written as the "component (B-3)") is usually used in such an amount that the molar ratio of the component (B-3) to the transition metal atoms (M) in the component (A) [(B-3)/M] is 1 to 10000, and preferably 1 to 5000.

The polymerization temperature is usually −50° C. to 300° C., preferably 100° C. to 250° C., and more preferably 130° C. to 200° C. In this range of polymerization temperatures, the solution viscosity during the polymerization is decreased and the removal of polymerization heat is facilitated with increasing temperature. The polymerization pressure is usually normal pressure to 10 MPa in gauze pressure (MPa-G), and preferably normal pressure to 8 MPa-G.

The polymerization reaction may be performed batchwise, semi-continuously or continuously. The polymerization may be carried out continuously in two or more polymerizers under different reaction conditions.

The molecular weight of the copolymer to be obtained may be controlled by controlling the hydrogen concentration in the polymerization system or the polymerization temperature. Alternatively, the molecular weight may be controlled by controlling the amount of the component (B) used. When hydrogen is added, the amount thereof is appropriately about 0.001 to 5000 NL per 1 kg of the copolymer formed.

The polymerization solvent used in the liquid-phase polymerization process is usually an inert hydrocarbon solvent, and is preferably a saturated hydrocarbon having a boiling point of 50° C. to 200° C. under normal pressure. Specific examples of the polymerization solvents include aliphatic hydrocarbons such as propane, butane, pentane, hexane, heptane, octane, decane, dodecane and kerosine, and alicyclic hydrocarbons such as cyclopentane, cyclohexane and methylcyclopentane. Particularly preferred solvents are hexane, heptane, octane, decane and cyclohexane. The α-olefins themselves which are the monomers may be used as the polymerization solvents. Although aromatic hydrocarbons such as benzene, toluene and xylene and halogenated hydrocarbons such as ethylene chloride, chlorobenzene and dichloromethane are usable as the polymerization solvents, the use of these solvents is not preferable from the point of view of the reduction of environmental loads and in order to minimize the influence on the human body health.

The kinematic viscosity of olefin polymers at 100° C. depends on the molecular weight of the polymers. That is, high-molecular weight polymers exhibit a high viscosity whilst low-molecular weight polymers have a low viscosity. Thus, the kinematic viscosity at 100° C. is adjustable by controlling the molecular weight in the above-described manner. The molecular weight distribution (Mw/Mn) of the obtainable polymer may be controlled to 3 or less by removing low-molecular weight components of the polymer using a known technique such as vacuum distillation. Further, the polymer obtained may be hydrogenated by a known method. The hydrogenated polymer having less double bonds attains enhancements in oxidation stability and heat resistance.

The glass transition point (Tg) of the olefin polymers may be controlled by changing, for example, the ethylene concentration or the hydrogen concentration in the polymerization system or the polymerization temperature.

⟨Copolymers⟩

The copolymers of the invention preferably contain ethylene units as structural units in the range of 30 to 70 mol %, more preferably 40 to 65 mol %, and particularly preferably 45 to 60 mol % and α-olefin units in the range of 30 to 70 mol %, more preferably 35 to 60 mol %, and particularly preferably 40 to 55 mol %. This composition of the units ensures that the obtainable lubricating oil composition will exhibit excellent temperature and viscosity characteristics.

The weight average molecular weight of the inventive copolymers is in the range of 1,000 to 50,000, preferably 2,000 to 40,000, more preferably 2,000 to 20,000, and particularly preferably 5,000 to 20,000. This molecular weight ensures that the copolymer, when used in a lubricating oil, will give an appropriately increased viscosity to the base oil and the lubricating oil will exhibit excellent shear stability.

The molecular weight distribution (Mw/Mn) of the inventive copolymers is 2.5 or less, preferably in the range of 1.1 to 2.5, and more preferably in the range of 1.2 to 2.2. This range ensures that the obtainable lubricating oil composition will exhibit excellent shear stability.

The number average molecular weight and the weight average molecular weight of copolymers may be measured by gel permeation chromatography (GPC) calibrated with standards having known molecular weights (monodispersed polystyrenes (PSt)). The molecular weight distribution (Mw/Mn) may be calculated based on the results obtained. When an α-olefin (co)polymer has a wide molecular weight distribution, the polymer contains a large amount of high-molecular weight components and/or low-molecular weight components that are out of the desired range of molecular weights. The presence of such high-molecular weight components causes a decrease in shear stability for the reasons described hereinabove.

As measured by differential scanning calorimetry (DSC), the inventive copolymers usually have a glass transition point (Tg) of less than −50° C., preferably in the range of −55 to −90° C., and more preferably −60 to −80° C. When the glass transition point is in this range, a lubricating oil composition including the copolymer exhibits excellent fluidity at low temperatures as compared to conventional lubricating oil compositions.

In the invention, the glass transition point (Tg) of the copolymers is measured by differential scanning calorimetry (DSC) in the following manner.

The sample pan is placed into a DSC cell. In a nitrogen atmosphere, the DSC cell is heated from 30° C. (room temperature) to 150° C. at 10° C./min and is held at 150° C. for 5 minutes. Thereafter, the DSC cell is cooled to −100° C. at 10° C./min (cooling process). Next, the cell is held at −100° C. for 5 minutes and is heated at 10° C./min. With respect to the enthalpy curve recorded during this heating process, the intersection point of the tangent at the inflection point is obtained as the glass transition point (Tg). The determination of the glass transition point (Tg) is based on JIS K7121 9.3.

In the copolymers of the invention, the value B represented by the following equation [1] is 1.1 or above, and preferably 1.2 or above.

[Math. 2]

$$B = \frac{P_{OE}}{2P_O \cdot P_E} \quad [1]$$

In the equation [1], $P_E$ is the molar fraction of ethylene components, $P_O$ is the molar fraction of α-olefin components, and $P_{OE}$ is the molar fraction of ethylene.α-olefin sequences relative to all the dyad sequences.

A larger value B indicates that the copolymer has less block sequences and has a narrow composition distribution with ethylene and the α-olefin being distributed uniformly. The length of such block sequences affects properties of the copolymer. That is, with increasing value B, the length of the block sequences is shorter and the copolymer exhibits a lower pour point and better low-temperature characteristics.

The value B is an index that indicates the randomness of the comonomer sequence distribution in the copolymer. $P_E$, $P_O$ and $P_{OE}$ in the above equation [1] may be determined by analyzing a $^{13}$C NMR spectrum based on the reports of J. C. Randall [Macromolecules, 15, 353 (1982)] and J. Ray [Macromolecules, 10, 773 (1977)].

In the copolymer obtained in the invention, the total number of double bonds in the molecular chains, specifically, vinyls, vinylidenes, disubstituted olefins and trisubstituted olefins measured by $^1$H-NMR is preferably less than 8.0, more preferably less than 5.0, and still more preferably less than 3.5 per 1000 carbon atoms before any hydrogenation operation. The lower limit is preferably 0 per 1000 carbon atoms. The above range of the number of double bonds in the molecular chains is preferable from the point of view of oxidation stability because such unsaturated moieties may be sufficiently hydrogenated by a hydrogenation operation. The number of double bonds in the molecular chains after the hydrogenation operation is preferably less than 1.0, more preferably less than 0.5, and still more preferably less than 0.3. When such a hydrogenated copolymer is used in a lubricating oil composition, the resultant lubricating oil composition attains good heat resistance.

In the copolymer of the invention, the intrinsic viscosity ([η]) measured at 135° C. in decalin solvent is preferably in the range of 0.02 to 0.4, more preferably 0.04 to 0.38, still more preferably 0.04 to 0.25, and particularly preferably 0.08 to 0.25. This range ensures that the copolymer, when used in a lubricating oil, will give an appropriately increased viscosity to the base oil and the lubricating oil will exhibit excellent shear stability.

In the invention, the intrinsic viscosity ([η]) of the copolymer is measured by the following method.

Approximately 20 mg of the polymer is dissolved into 15 ml of decalin. The specific viscosity $η_{sp}$ is measured in an oil bath at 135° C. This decalin solution is diluted by the addition of 5 ml of decalin solvent, and the specific viscosity $η_{sp}$ is measured in the similar manner. This dilution operation is repeated two more times, and the concentration (C) is extrapolated to zero. The $η_{sp}/C$ value at the zero concentration is obtained as the intrinsic viscosity.

$$[η]=\lim(η_{sp}/C)(C\to 0)$$

⟨Lubricating Oil Compositions⟩

The lubricating oil composition of the invention includes the inventive copolymer. The content of the inventive copolymer is preferably 1 mass % to 100 mass %, more preferably 1 mass % to 90 mass %, and particularly preferably 2 mass % to 70 mass % relative to 100 mass % of the lubricating oil composition.

The lubricating oil composition of the invention may contain a low-viscosity base oil as required. The low-viscosity base oil used in the lubricating oil composition of the invention is at least one base oil selected from known mineral oils, synthetic hydrocarbon oils and esters oils, and has a kinematic viscosity at 100° C. in the range of 2 to 40 mm$^2$/s.

The mineral oils are classified into several grades depending on how they are refined. Those mineral oils having a wax content of 0.5 to 10% are generally used. For example, use may be made of highly refined oils that are produced by a hydrocracking refining process, have a low pour point and a high viscosity index, and are based on isoparaffin.

Other suitable base oils are gas to liquid (GTL) base oils obtained by the Fischer-Tropsch process. Examples of such GTL base oils include those described in EP0776959, EP0668342, WO 97/21788, WO 00/15736, WO 00/14188, WO 00/14187, WO 00/14183, WO 00/14179, WO 00/08115, WO 99/41332, EP1029029, WO 01/18156 and WO 01/57166.

Examples of the synthetic hydrocarbon oils include α-olefin oligomers, alkylbenzenes and alkylnaphthalenes. These may be used singly, or two or more may be used in combination. Examples of the α-olefin oligomers include low-molecular weight oligomers of at least one olefin selected from olefins having 8 to 12 carbon atoms (except the inventive copolymer). When such α-olefin oligomers are used in the lubricating oil composition of the invention, the resultant lubricating oil composition attains highly excellent temperature viscosity characteristics, low-temperature viscosity characteristics and heat resistance. Such α-olefin oligomers may be produced by cationic polymerization, thermal polymerization or radical polymerization catalyzed by a Ziegler catalyst or a Lewis acid. Alternatively, such oligomers may be available in industry. Those oligomers having a kinematic viscosity at 100° C. of 2 mm$^2$/s to 100 mm$^2$/s are available in the market. Some exemplary commercial products are NEXBASE manufactured by NESTE, Spectrasyn manufactured by ExxonMobil Chemical, Durasyn manufactured by Ineos Oligmers, and Synfluid manufactured by Chevron Phillips Chemical.

The alkylbenzenes and the alkylnaphthalenes are most often dialkylbenzenes or dialkylnaphthalenes usually having alkyl chains composed of 6 to 14 carbon atoms. Such alkylbenzenes and alkylnaphthalenes are produced by the Friedel-Craft alkylation reaction of benzene or naphthalene with olefins. The olefins for alkylation used in the production of the alkylbenzenes or the alkylnaphthalenes may be linear or branched olefins or combinations of such olefins. For example, a method for producing such compounds is described in U.S. Pat. No. 3,909,432.

The esters are preferably fatty acid esters from the point of view of the compatibility with the copolymer. When the synthetic hydrocarbon oil is used as the low-viscosity base oil of the lubricating oil composition, the addition of the ester provides an excellent effect in the prevention of the swelling of a lubricating oil sealant.

Examples of the fatty acid esters, although not particularly limited to, include the following fatty acid esters composed solely of carbon, oxygen and hydrogen.

Examples include monoesters produced from monobasic acids and alcohols; diesters produced from dibasic acids and alcohols, or from diols and monobasic acids or acid mixtures; and polyol esters produced by reacting monobasic acids or acid mixtures with polyols such as diols, triols (for example, trimethylolpropane), tetraols (for example, pentaerythritol) and hexaols (for example, dipentaerythritol). Examples of such esters include tridecyl pelargonate, di-2-ethylhexyl adipate, di-2-ethylhexyl azelate, trimethylolpropane triheptanoate and pentaerythritol tetraheptanoate.

From the point of view of the compatibility with the inventive copolymer, specifically, the alcohol moiety in the ester is preferably an alcohol having 2 or more hydroxyl groups, and the fatty acid moiety is preferably a fatty acid having 8 or more carbon atoms. As the fatty acids, those fatty acids having 20 or less carbon atoms are easily available in industry and are advantageous in terms of production cost. The performance disclosed in the invention is fully obtained regardless of whether the ester includes a single fatty acid or a mixture of two or more kinds of such acids. More specific examples include a triester of trimethylolpropane with a mixture of lauric acid and stearic acid, and diisodecyl adipate. These esters are preferable from the point of view of the compatibility with saturated hydrocarbon components such as the copolymer, as well as with stabilizers described later such as polar group-containing antioxidants, corrosion inhibitors, antiwear agents, friction controllers, pour-point depressants, antirust agents and antifoaming agents.

When the synthetic hydrocarbon oil is used as the low-viscosity base oil, the lubricating oil composition of the invention preferably contains the fatty acid ester in an amount of 5 to 20 mass % relative to the whole lubricating oil composition taken as 100 mass %. By the incorporation of 5 mass % or more of the fatty acid ester, the composition attains good conformity with lubricating oil sealants such as resins and elastomers used in various internal combustion engines and industrial machines. Specifically, the swelling of lubricating oil sealants can be prevented. From the points of view of oxidation stability and heat resistance, the amount of the ester is preferably not more than 20 mass %. When the lubricating oil composition contains the mineral oil, the fatty acid ester is not necessarily used because the mineral oil itself has an effect in preventing the swelling of lubricating oil sealants.

The lubricating oil composition of the invention may contain additives such as extreme pressure additives, detergent dispersants, viscosity index improvers, antioxidants, corrosion inhibitors, antiwear agents, friction controllers, pour-point depressants, antirust agents and antifoaming agents.

Examples of the additives used in the lubricating oil compositions of the invention include the following. These additives may be used singly, or two or more may be used in combination.

Extreme pressure additives: Extreme pressure additives are compounds that have an effect of preventing seizing when internal combustion engines or industrial machines are subjected to high load conditions. The additives are not particularly limited. Examples include sulfur-containing extreme pressure additives such as sulfides, sulfoxides, sulfones, thiophosphinates, thiocarbonates, sulfurized oils and fats, and sulfurized olefins; phosphoric acids such as phosphate esters, phosphite esters, phosphate ester amine salts and phosphite ester amine salts; and halogen compounds such as chlorinated hydrocarbons. Two or more of these compounds may be used in combination.

In some cases, hydrocarbons or other organic components constituting the lubricating oil composition may be carbonized by heat or shear before the extreme pressure lubrication conditions are reached, forming a carbide film on the metal surface. Thus, the extreme pressure additive used alone may be prevented from sufficient contact with the metal surface by such a carbide film, and the extreme pressure additive may fail to provide sufficient effects that are expected.

The extreme pressure additive may be added singly. However, in view of the fact that the lubricating oil composition of the invention consists primarily of saturated hydrocarbons such as the copolymer, an advantage in dispersibility may be obtained by adding the extreme pressure additive together with other additives as a solution in a lubricant base oil such as a mineral oil or a synthetic hydrocarbon oil. Specifically, an extreme pressure additive package is more preferably added to the lubricating oil composition. The extreme pressure additive package is obtained by blending components including the extreme pressure additive component in advance and dissolving the blend into a lubricant base oil such as a mineral oil or a synthetic hydrocarbon oil.

Preferred examples of the extreme pressure additives (packages) include Angramol-98A manufactured by LUBRIZOL, HITEC 1532 manufactured by AFTON CHEMICAL, HITEC 307 manufactured by AFTON CHEMICAL, HITEC 3339 manufactured by AFTON CHEMICAL and Additin RC 9410 manufactured by RHEIN CHEMIE.

Detergent dispersants: Examples include metal sulfonates, metal phenates, metal phosphanates and succinimide. The detergent dispersants are used as required in the range of 0 to 15 mass % relative to 100 mass % of the lubricating oil composition.

DI packages which include the dispersants and other additives in the form of solutions in lubricant oils such as mineral oils or synthetic hydrocarbon oils are available in industry. Examples thereof include HITEC 3419D manufactured by AFTON CHEMICAL and HITEC 2426 manufactured by AFTON CHEMICAL.

Antiwear agents: Examples include inorganic or organic molybdenum compounds such as molybdenum disulfide, graphite, antimony sulfide and polytetrafluoroethylene. The antiwear agents are used as required in the range of 0 to 3 mass % relative to 100 mass % of the lubricating oil composition.

Antioxidants: Examples include phenol compounds such as 2,6-di-tert-butyl-4-methylphenol, and amine compounds. The antioxidants are used as required in the range of 0 to 3 mass % relative to 100 mass % of the lubricating oil composition.

Antirust agents: Examples include various amine compounds, metal carboxylate salts, polyhydric alcohol esters, phosphorus compounds and sulfonates. The antirust agents are used as required in the range of 0 to 3 mass % relative to 100 mass % of the lubricating oil composition.

Antifoaming agents: Examples include silicone compounds such as dimethylsiloxane and silica gel dispersions, alcohol compounds and ester compounds. The antifoaming agents are used as required in the range of 0 to 0.2 mass % relative to 100 mass % of the lubricating oil composition.

Pour-point depressants: The pour-point depressants may be any of various known pour-point depressants. Specific examples include polymer compounds having organic acid ester groups. Vinyl polymers having organic acid ester groups are particularly suited. Examples of the vinyl polymers having organic acid ester groups include (co)polymers of alkyl methacrylates, (co)polymers of alkyl acrylates, (co)polymers of alkyl fumarates, (co)polymers of alkyl maleates and alkylated naphthalenes.

The pour-point depressants have a melting point of not more than −13° C., preferably not more than −15° C., and more preferably not more than −17° C. The melting point of the pour-point depressants is measured with a differential scanning calorimeter (DSC). Specifically, approximately 5 mg of the sample is placed into an aluminum pan, heated to 200° C., held at 200° C. for 5 minutes, cooled to −40° C. at 10° C./min, held at −40° C. for 5 minutes, and heated at 10° C./min, and the endothermic curve obtained during the second heating is analyzed to determine the melting point.

The pour-point depressants have a weight average molecular weight in the range of 20,000 to 400,000, preferably 30,000 to 300,000, and more preferably in the range of 40,000 to 200,000 as measured by gel permeation chromatography relative to polystyrenes.

The pour-point depressants are usually used in the range of 0 to 2 mass %.

In addition to the additives described hereinabove, other additives such as demulsifying agents, colorants and oiliness agents (oiliness improvers) may be used as required.

The lubricating oil composition of the invention has excellent shear stability by virtue of its containing the specific copolymer. The shear stability is evaluated by a KRL shear stability test in accordance with the method described in Deutsche Industrie Normen DIN 52350-6. Specifically, the lubricating oil composition is subjected to shear conditions (1450 rpm) at 60° C. for 20 hours and the decrease in kinematic viscosity at 100° C. after the testing relative to the kinematic viscosity at 100° C. before the testing is determined. The smaller the difference, the higher the shear stability.

⟨Uses⟩

The lubricating oil compositions of the invention may be used as industrial lubricating oils (gear oils and hydraulic oils) and base oils for greases. In particular, the compositions are suited as automobile lubricating oils. Further, the compositions may be suitably used as automobile gear oils such as differential gear oils, and automobile driving oils such as manual transmission oils, automatic transmission oils and continuously variable transmission oils. Furthermore, the compositions may be used for automobile engine oils and marine cylinder oils. The lubricating oil composition of the invention as an automobile transmission oil exhibits excellent fuel-saving performance when its kinematic viscosity at 100° C. is controlled to not more than 7.5 $mm^2/s$, preferably not more than 6.5 $mm^2/s$, and more preferably not more than 5.5 $mm^2/s$.

EXAMPLES

The present invention will be described in further detail based on examples hereinbelow without limiting the scope of the invention to such examples.

[Evaluation Methods]

In the following description such as Examples and Comparative Examples, properties and characteristics of ethylene/α-olefin copolymers and lubricating oil compositions were measured by the following methods.

⟨Ethylene content (mol %)⟩

With Fourier transform infrared spectrophotometer FT/IR-610 or FT/IR-6100 manufactured by JASCO Corporation, the absorbance ratio (D1155 $cm^{-1}$/D721 $cm^{-1}$) of the absorption near 1155 $cm^{-1}$ based on the framework vibrations of propylene to the absorption near 721 $cm^{-1}$ based on the transverse vibrations of long-chain methylene groups was calculated. The ethylene content (wt %) was determined based on a calibration curve prepared beforehand (using standard samples in accordance with ASTM D3900). Subsequently, the propylene content (wt %) was obtained by subtracting the ethylene content (wt %) obtained above from 100 wt %. Next, the ethylene content (mol %) was determined using the following equation based on the ethylene content (wt %) and the propylene content (wt %).

[Math. 3]

$$\text{Ethylene content (mol \%)} = \frac{[\text{Ethylene content (wt \%)} \div 28]}{[\text{Ethylene content (wt \%)} \div 28] + [\text{Propylene content (wt \%)} \div 42]}$$

⟨Value B⟩

A $^{13}C$ NMR spectrum was measured in o-dichlorobenzene/benzene-$d_5$ (4/1 [vol/vol %]) as a measurement solvent at a measurement temperature of 120° C., a spectrum width of 250 ppm, a pulse repetition time of 5.5 sec and a pulse width of 4.7·sec (45° pulse) (100 MHz, ECX400P manufactured by JEOL Ltd.) or at a measurement temperature of 120° C., a spectrum width of 250 ppm, a pulse repetition time of 5.5 sec and a pulse width of 5.0·sec (45° pulse) (125 MHz, AVANCE III cryo-500 manufactured by Bruker BioSpin K.K.). The value B was calculated based on the equation [1] below.

[Math. 4]

$$B = \frac{P_{OE}}{2P_O \cdot P_E} \quad [1]$$

In the equation [1], $P_E$ is the molar fraction of ethylene components, $P_O$ is the molar fraction of α-olefin components, and $P_{OE}$ is the molar fraction of ethylene.α-olefin sequences relative to all the dyad sequences.

⟨Weight Average Molecular Weight (Mw), Number Average Molecular Weight (Mn) and Molecular Weight Distribution (Mw/Mn)⟩

The number average molecular weight (Mn) and the weight average molecular weight (Mw) were measured as described below using GPC (HLC-8320GPC) manufactured by TOSOH CORPORATION. TSKgel SuperMultipore HZ-M (four columns) were used as separation columns. The column temperature was 40° C. Tetrahydrofuran (manufactured by Wako Pure Chemical Industries, Ltd.) was used as a mobile phase. The developing speed was 0.35 ml/min. The sample concentration was 5.5 g/L. The sample injection amount was 20 μl. A differential refractometer was used as a detector. Standard polystyrenes manufactured by TOSOH CORPORATION (PStQuick MP-M) were used. The average molecular weights were calculated relative to the molecular weights of the polystyrenes in accordance with general calibration procedures.

The molecular weight distribution (Mw/Mn) was calculated by dividing the Mw measured by the above measurement method by the Mn measured by the above measurement method.

⟨Intrinsic Viscosity ([η])⟩

The measurement was performed in decal in solvent at 135° C. Approximately 20 mg of the polymer was dissolved in 15 ml of decalin, and the specific viscosity $\eta_{sp}$ was measured in an oil bath at 135° C. This decalin solution was diluted by the addition of 5 ml of decalin solvent, and the specific viscosity $\eta_{sp}$ was measured in the similar manner. This dilution operation was repeated two more times, and the concentration (C) was extrapolated to zero. The $\eta_{sp}/C$ value at the zero concentration was obtained as the intrinsic viscosity.

$$[\eta] = \lim(\eta_{sp}/C)(C \to 0)$$

⟨Number of Double Bonds in Molecular Chains⟩

A $^1$H NMR spectrum was measured in o-dichlorobenzene-d$_4$ as a measurement solvent at a measurement temperature of 120° C., a spectrum width of 20 ppm, a pulse repetition time of 7.0 sec and a pulse width of 6.15 μsec (45° pulse) (400 MHz, ECX400P manufactured by JEOL Ltd.). The number of double bonds was calculated based on the results.

⟨DSC Measurement⟩

X-DSC-7000 manufactured by Seiko Instruments Inc. was used. Approximately 8 mg of the ethylene/α-olefin copolymer was placed into a readily closable aluminum sample pan, and the pan was arranged in the DSC cell. In a nitrogen atmosphere, the DSC cell was heated from room temperature to 150° C. at 10° C./min and was held at 150° C. for 5 minutes. Thereafter, the DSC cell was cooled to −100° C. at 10° C./min (cooling process). Next, the cell was held at −100° C. for 5 minutes and was heated at 10° C./min. With respect to the enthalpy curve recorded during this heating process, the intersection point of the tangent at the inflection point was obtained as the glass transition point (Tg). The determination of the glass transition point (Tg) was based on JIS K7121 9.3.

⟨Viscosity Characteristics⟩

The kinematic viscosity at 100° C., the kinematic viscosity at 40° C., and the viscosity index were measured and calculated by the methods described in JIS K2283.

⟨KRL Shear Stability⟩

The shear stability of the lubricating oil composition was evaluated with a KRL shear stability tester in accordance with the method described in DIN 52350-6. The blended oil was subjected to shear conditions (1450 rpm) at 60° C. for 20 hours and the decrease in kinematic viscosity at 100° C. between before and after the testing was determined.

The durability is good when the decrease in kinematic viscosity after the application of shear stress by the above method is less than 10%. The durability is extremely excellent when the decrease in kinematic viscosity is less than 5%.

⟨Ultrasonic Shear Stability⟩

To evaluate the ultrasonic shear stability, the lubricating oil composition was ultrasonicated for 60 minutes in accordance with JASO M347 and the decrease in kinematic viscosity at 100° C. between before and after the testing was determined.

The durability is good when the decrease in kinematic viscosity after the application of shear stress by the above method is less than 5%. The durability is extremely excellent when the decrease in kinematic viscosity is less than 1%.

⟨Low-Temperature Viscosity⟩

The low-temperature viscosity was measured at a prescribed temperature with a Brookfield viscometer in accordance with ASTM D2983.

⟨Synthesis of Metallocene Compounds⟩

The metallocene compounds used in Examples and Comparative Examples were synthesized by the following methods. The structures of the metallocene compounds synthesized and of the precursors of the compounds were identified by measuring data such as $^1$H NMR spectra (270 MHz, GSH-270 manufactured by JEOL Ltd.) and FD-mass (hereinafter, written as "FD-MS") spectra (SX-102A manufactured by JEOL Ltd.).

Synthetic Example 1

Synthesis of [methylphenylmethylene($\eta^5$-cyclopentadienyl)($\eta^5$-2,7-di-t-butylfluorenyl)]zirconium dichloride (i) Synthesis of 6-methyl-6-phenylfulvene In a nitrogen atmosphere, a 200 mL three-necked flask was loaded with 7.3 g (101.6 mmol) of lithium cyclopentadiene and 100 mL of dehydrated tetrahydrofuran. The mixture was stirred. The resultant solution was cooled in an ice bath, and 15.0 g (111.8 mmol) of acetophenone was added dropwise. The mixture was stirred at room temperature for 20 hours. The resultant solution was quenched with an aqueous diluted hydrochloric acid solution. 100 mL of hexane was added, and soluble components were extracted. The organic phase was then washed with water and saturated brine and was dried with anhydrous magnesium sulfate. Thereafter, the solvent was distilled off, and the resultant viscous liquid was separated by column chromatography (hexane) to give the target product (a red viscous liquid)

(amount 14.7 g, yield 78%). $^1$H NMR spectroscopy identified the product to be 6-methyl-6-phenylfulvene. The measured values are given below.

$^1$H NMR spectrum (270 MHz, CDCl$_3$): δ/ppm 7.39 (m, 5H), 6.64 (m, 1H), 6.57 (m, 1H), 6.48 (m, 1H), 6.18 (m, 1H), 2.54 (s, 3H).

(ii) Synthesis of methyl(cyclopentadienyl)(2,7-di-t-butylfluorenyl)(phenyl)methane In a nitrogen atmosphere, a 100 mL three-necked flask was loaded with 2.01 g (7.20 mmol) of 2,7-di-t-butylfluorene and 50 mL of dehydrated t-butyl methyl ether. While performing cooling in an ice bath, 4.60 mL (7.59 mmol) of a (1.65 M) n-butyllithium/hexane solution was added gradually. The mixture was stirred at room temperature for 16 hours. Further, 1.66 g (9.85 mmol) of 6-methyl-6-phenylfulvene was added, and the mixture was stirred for 1 hour while performing heating under reflux. While performing cooling in an ice bath, 50 mL of water was added gradually. The resultant two-phase solution was transferred to a 200 mL separatory funnel. After 50 mL of diethyl ether had been added, the funnel was shaken several times and the aqueous phase was removed. The organic phase was washed with 50 mL of water three times and with 50 mL of saturated brine one time. The liquid was dried with anhydrous magnesium sulfate for 30 minutes and thereafter the solvent was distilled off under reduced pressure. A small amount of hexane was added, and the solution was ultrasonicated. The resultant solid precipitate was recovered, washed with a small amount of hexane, and dried under reduced pressure to afford 2.83 g (6.34 mmol, 88.1%) of methyl(cyclopentadienyl)(2,7-di-t-butylfluorenyl)(phenyl)methane as a white solid. FD-MS spectroscopy identified the product to be methyl(cyclopentadienyl)(2,7-di-t-butylfluorenyl)(phenyl)methane. The measured value is given below.

FD-MS spectrum: M/z 446 (M$^+$).

(iii) Synthesis of [methylphenylmethylene($\eta^5$-cyclopentadienyl)($\eta^5$-2,7-di-t-butylfluorenyl)]zirconium dichloride In a nitrogen atmosphere, a 100 mL Schlenk flask was loaded sequentially with 1.50 g (3.36 mmol) of methyl (cyclopentadienyl)(2,7-di-t-butylfluorenyl)(phenyl)methane, 50 mL of dehydrated toluene and 570 μL (7.03 mmol) of THF. While performing cooling in an ice bath, 4.20 mL (6.93 mmol) of a (1.65 M) n-butyllithium/hexane solution was added gradually. The mixture was stirred at 45° C. for 5 hours. The solvent was distilled off under reduced pressure, and 40 mL of dehydrated diethyl ether was added. The addition resulted in a red solution. While performing cooling in a methanol/dry ice bath, 728 mg (3.12 mmol) of zirconium tetrachloride was added. Stirring was performed for 16 hours while increasing the temperature gradually to room temperature, resulting in a red orange slurry. The solvent was distilled off under reduced pressure. In a glove box, the resultant solid was washed with hexane and was extracted with dichloromethane. The extract was concentrated by distilling off the solvent under reduced pressure. A small amount of hexane was added to the concentrate, and the mixture was allowed to stand at −20° C. The resultant red orange solid precipitate was washed with a small amount of hexane and was dried under reduced pressure. In this manner, 1.20 g (1.98 mmol, 63.3%) of [methylphenylmethylene ($\eta^5$-cyclopentadienyl)($\eta^5$-2,7-di-t-but ylfluorenyl)]zirconium dichloride was obtained as a red orange solid. $^1$H NMR spectroscopy identified the product to be [methylphenylmethylene($\eta^5$-cyclopentadienyl)($\eta^5$-2,7-di-t-but ylfluorenyl)] zirconium dichloride. The measured values are given below.

$^1$H NMR spectrum (270 MHz, CDCl$_3$): δ/ppm 8.02 (d, J=8.9 Hz, 1H), 7.96 (d, J=9.1 Hz, 1H), 7.89-7.86 (br, 1H), 7.78 (br, 1H), 7.69-7.62 (m, 2H), 7.59-7.50 (m, 2H), 7.44-7.38 (m, 2H), 6.40-6.37 (m, 1H), 6.28-6.25 (m, 1H), 6.05 (br, 1H), 5.81-5.78 (m, 1H), 5.60-5.57 (m, 1H), 2.53 (s, 3H), 1.37 (s, 9H), 0.95 (s, 9H).

Synthetic Example 2

Synthesis of [diphenylmethylene[$\eta^5$-(2-methyl-4-i-propylcyclopentadienyl)]($\eta^5$-octamethyloctahydrodibenzofluorenyl)]zirconium dichloride (i) Synthesis of 1-methyl-3-i-propyl-6,6-diphenylfulvene In a nitrogen atmosphere, a 200 mL three-necked flask was loaded with 2.13 g of 1-methyl-3-i-propylcyclopentadiene (GC purity: 88.5%) and 100 mL of dehydrated THF. While performing cooling in an ice bath, 10.7 mL (17.4 mmol) of a (1.63 M) n-butyllithium/hexane solution was added gradually. The mixture was stirred at room temperature for 4 hours. While performing cooling again in an ice bath, 2.37 g (20.7 mmol) of DMI was added gradually. The mixture was stirred at room temperature for 30 minutes. Thereafter, 3.49 g (19.2 mmol) of benzophenone was added, and the mixture was stirred for 20 hours while performing heating under reflux. While performing cooling in an ice bath, 50 mL of water was gradually added and further 50 mL of diethyl ether was added. The mixture was stirred at room temperature for 30 minutes. The resultant two-phase solution was transferred to a 500 mL separatory funnel. The organic phase was washed with 100 mL of water three times and with 100 mL of saturated brine one time. The liquid was dried with anhydrous magnesium sulfate for 30 minutes and thereafter the solvent was distilled off under reduced pressure. An orange brown solid was thus obtained. The product was separated by silica gel chromatography (300 g, hexane) to afford a red solution. The solvent was distilled off under reduced pressure. In this manner, 2.09 g (7.29 mmol) of 1-methyl-3-i-propyl-6,6-diphenylfulvene was obtained as a red oily product. $^1$H NMR spectroscopy identified the product to be 1-methyl-3-i-propyl-6,6-diphenylfulvene. The measured values are given below.

$^1$H NMR spectrum (270 MHz, CDCl$_3$): δ/ppm 7.36-7.22 (m, 10H), 6.25-6.23 (m, 1H), 5.74-5.73 (m, 1H), 2.68-2.52 (m, 1H), 1.48 (d, J=1.4 Hz, 3H), 1.12 (d, J=6.8 Hz, 6H).

(ii) Synthesis of (2-methyl-4-i-propylcyclopentadienyl)(octamethyloctahydrodibenzofluorenyl)diphenylmethane In a nitrogen atmosphere, a 200 mL three-necked flask was loaded with 1.73 g (4.46 mmol) of octamethyloctahydrodibenzofluorene and 70 mL of dehydrated t-butyl methyl ether. While performing cooling in an ice bath, 2.90 mL (4.73 mmol) of a (1.63 M) n-butyllithium/hexane solution was added gradually. The mixture was stirred at room temperature for 7 hours. Further, 834 mg (2.91 mmol) of 1-methyl-3-i-propyl-6,6-diphenylfulvene was added, and the mixture was stirred for 17 hours while performing heating under reflux and was then cooled to room temperature. While performing cooling in an ice bath, 50 mL of water and subsequently 50 mL of diethyl ether were added gradually. The resultant two-phase solution was transferred to a 500 mL separatory funnel. The funnel was shaken several times and the aqueous phase was removed. The organic phase was washed with 100 mL of water three times and with 100 mL of saturated brine one time. The liquid was dried with anhydrous magnesium sulfate for 30 minutes and thereafter the solvent was distilled off under reduced pressure. The resultant solid was washed with methanol and was separated by silica gel chromatography (60 g, hexane) to afford a colorless solution. The solvent was distilled off under reduced pressure. In this manner, 1.03 g (1.53 mmol, 52.5%) of (2-methyl-4-i-propylcyclopentadienyl)(octamethyloctahydrodibenzofluorenyl)diphenylmethane was obtained as awhile solid. FD-MS spectroscopy identified the product to be (2-methyl-4-i-propylcyclopentadienyl)(octamethyloctahydrodibenzofluorenyl)diphenylmethane. The measured value is given below.

FD-MS spectrum: M/z 673 (M$^+$).

(iii) Synthesis of [diphenylmethylene[$\eta^5$-(2-methyl-4-i-propylcyclopentadienyl)]($\eta^5$-octamethyloctahydrodibenzofluorenyl)]zirconium dichloride In a nitrogen atmosphere, a 100 mL Schlenk flask was loaded sequentially with 926 mg (1.38 mmol) of (2-methyl-4-i-propylcyclopentadienyl)(octamethyloctahydrod ibenzofluorenyl)diphenylmethane, 30 mL of dehydrated toluene and 0.24 mL (3.0 mmol) of dehydrated THF. While performing cooling in an ice bath, 1.80 mL (2.93 mmol) of a (1.63 M) n-butyllithium/hexane solution was added gradually. The mixture was stirred at 45° C. for 4 hours to form a red solution. The solvent was distilled off under reduced pressure, and 30 mL of dehydrated diethyl ether was added to form again a red solution. While performing cooling in a methanol/dry ice bath, 280 mg (4.27 mmol) of zirconium tetrachloride was added. Stirring was performed for 17 hours while increasing the temperature gradually to room temperature, resulting in a red slurry. The solvent was distilled off under reduced pressure. In a glove box, the resultant solid was extracted with hexane. The extract was concentrated by distilling off the solvent under reduced pressure. Recrystallization was performed at −20° C. The solid precipitated was washed with a small amount of hexane and was dried under reduced pressure. In this manner, 345 mg (0.414 mmol, 34.5%) of [diphenylmethylene[$\eta^5$-(2-methyl-4-i-propylcyclopentadienyl)]($\eta^5$-octamethyloctahydrodibenzofluorenyl)]zirconium dichloride was obtained as a red solid. $^1$H NMR spectroscopy and FD-MS spectroscopy identified the product to be [diphenylmethylene[$\eta^5$-(2-methyl-4-i-propylcyclopentadienyl)]($\eta^5$-octamethyloctahydrodibenzofluorenyl)]zirconium dichloride. The measured values are given below.

$^1$H NMR spectrum (270 MHz, CDCl$_3$): δ/ppm 8.07-7.93 (m, 5H), 7.80-7.76 (m, 1H), 7.48-7.19 (m, 6H), 6.96 (s, 1H), 6.04 (s, 1H), 5.99 (d, J=3.0 Hz, 1H), 5.40 (d, J=3.0 Hz, 1H), 2.57 (sep, J=7.0 Hz, 1H), 1.85 (s, 3H), 1.7-1.6 (br m, 8H), 1.50 (s, 3H), 1.47 (s, 3H), 1.43 (s, 3H), 1.40 (s, 3H), 1.11 (d, J=7.0 Hz, 3H), 1.07 (s, 3H), 1.01 (d, J=7.0 Hz, 3H), 0.88 (s, 3H), 0.86 (s, 3H), 0.77 (s, 3H)

FD-MS spectrum: M/z 832 (M$^+$).

Synthesis of Other Metallocene Compounds

[Ethylene($\eta^5$-cyclopentadienyl)($\eta^5$-2,7-di-t-butylfluorenyl)]zirconium dichloride was synthesized by a method described in Japanese Patent No. 4367687.

[Diphenylmethylene($\eta^5$-2-methyl-4-t-butylcyclopentadienyl)($\eta^5$-2,7-di-t-butylfluorenyl)]zirconium dichloride was synthesized by a method described in WO 2004/087775.

[Dimethylmethylene($\eta^5$-cyclopentadienyl)($\eta^5$-2,7-di-t-butylfluorenyl)]zirconium dichloride was synthesized by a method described in JP-A-H04-69394.

[Diphenylmethylene($\eta^5$-cyclopentadienyl)($\eta^5$-2,7-di-t-butylfluorenyl)]zirconium dichloride was synthesized by a method described in JP-A-H06-172433.

[Diphenylsilylene($\eta^5$-cyclopentadienyl)($\eta^5$-2,7-di-t-butylfluorenyl)]zirconium dichloride was synthesized by a method described in J. Organomet. Chem., 509, 63 (1996).

[Bis($\eta^5$-1,3-dimethylcyclopentadienyl)]zirconium dichloride was synthesized by a method described in JP-B-H06-62642.

[Bis($\eta^5$-1-methyl-3-n-butylcyclopentadienyl)]zirconium dichloride was synthesized by a method described in WO 95/04761.

[Production of Ethylene/α-Olefin Copolymers]

Ethylene/α-olefin copolymers were produced in Examples and Comparative Examples described below. The ethylene/α-olefin copolymers obtained were hydrogenated by the method described below as required. Data such as the production conditions in Examples and Comparative Examples, and the properties of the ethylene/α-olefin copolymers obtained are shown in Table 1 and Table 2.

⟨Hydrogenation Process⟩

A 1 L-volume stainless steel autoclave was loaded with 100 mL of a hexane solution of a 0.5 mass % Pd/alumina catalyst and 500 mL of a 30 mass % hexane solution of the ethylene/α-olefin copolymer. After being tightly closed, the autoclave was purged with nitrogen. Next, the temperature was increased to 140° C. while performing stirring and the system was purged with hydrogen. The pressure was raised with hydrogen to 1.5 MPa and the hydrogenation reaction was performed for 15 minutes.

Example 1

Ethylene/Propylene Copolymerization with [ethylene($\eta^5$-cyclopentadienyl)($\eta^5$-2,7-di-t-butylfluorenyl)]zirconium dichloride (50° C.)

A 1 L-volume glass polymerizer that had been thoroughly purged with nitrogen was loaded with 250 mL of heptane. After the temperature of the system had been increased to 50° C., 25 L/hr of ethylene, 75 L/hr of propylene and 100 L/hr of hydrogen were continuously supplied to the polymerizer. The mixture was stirred at a rotational speed of 600 rpm. Next, 0.2 mmol of triisobutylaluminum was added to the polymerizer. Subsequently, a mixture obtained beforehand by mixing 0.688 mmol of MMAO and 0.00230 mmol of [ethylene($\eta^5$-cyclopentadienyl) ($\eta^5$-2,7-di-t-butylfluorenyl)]zirconium dichloride for at least 15 minutes in toluene was fed to the polymerizer thereby to initiate the polymerization. The polymerization was performed at 50° C. for 15 minutes while continuously supplying ethylene, propylene and hydrogen. The polymerization was terminated by the addition of a small amount of isobutyl alcohol to the system. The unreacted monomers were purged. The polymer solution obtained was washed with 100 mL of 0.2 mol/L hydrochloric acid three times and with 100 mL of distilled water three times, and was dried with magnesium sulfate. The solvent was distilled off under reduced pressure. The polymer was dried at 80° C. under reduced pressure overnight. As a result, 1.43 g of the ethylene-propylene copolymer was obtained. The polymer had an ethylene content of 48.4 mol %, Mw of 17430, Mw/Mn of 2.1, [η] of 0.23 dl/g, Tg of −63° C. and a value B of 1.3. In the molecular chains, the number of vinyl double bonds was 0.05, that of vinylidene double bonds was 0.29, that of disubstituted olefin double bonds was <0.01, and that of trisubstituted olefin double bonds was 0.09 (per 1000 carbon atoms).

Example 2

Ethylene/Propylene Copolymerization with [diphenylmethylene($\eta^5$-2-methyl-4-t-butylcyclopentadienyl)($\eta^5$-2,7-di-t-butylfluorenyl)]zirconium dichloride (50° C.)

The polymerization was performed in the same manner as in Example 1, except that 0.00230 mmol of [ethylene($\eta^5$-cyclopentadienyl) ($\eta^5$-2,7-di-t-butylfluorenyl)]zirconium dichloride was replaced by 0.00202 mmol of [diphenylmethylene($\eta^5$-2-methyl-4-t-butylcyclopentadienyl)($\eta^5$-2,7-di-t-butylfluorenyl)]zirconium dichloride, 0.688 mmol of MMAO was replaced by 0.607 mmol of MMAO, the flow rate of ethylene was changed from 25 L/hr to 55 L/hr, and the flow rate of propylene was changed from 75 L/hr to 45 L/hr. As a result, 1.60 g of an ethylene-propylene copolymer was obtained. The polymer had an ethylene content of 51.3 mol %, Mw of 18380, Mw/Mn of 1.8, [η] of 0.24 dl/g, Tg of −62° C. and a value B of 1.1. In the molecular chains, the number of vinyl double bonds was 0.04, that of vinylidene double bonds was 0.12, that of disubstituted olefin double bonds was <0.01, and that of trisubstituted olefin double bonds was 0.06 (per 1000 carbon atoms).

Example 3

Ethylene/Propylene Copolymerization with [dimethylmethylene($\eta^5$-cyclopentadienyl) ($\eta^5$-2,7-di-t-butylfluorenyl)]zirconium dichloride (50° C.)

The polymerization was performed in the same manner as in Example 1, except that 0.00230 mmol of [ethylene($\eta^5$-cyclopentadienyl)($\eta^5$-2,7-di-t-butylfluorenyl)] zirconium dichloride was replaced by 0.00215 mmol of [dimethylmethylene($\eta^5$-cyclopentadienyl)($\eta^5$-2,7-di-t-butylfluorenyl)] zirconium dichloride, 0.688 mmol of MMAO was replaced by 0.645 mmol of MMAO, the flow rate of ethylene was changed from 25 L/hr to 55 L/hr, and the flow rate of propylene was changed from 75 L/hr to 45 L/hr. As a result, 1.40 g of an ethylene-propylene copolymer was obtained. The polymer had an ethylene content of 54.3 mol %, Mw of 28805, Mw/Mn of 1.9, [η] of 0.34 dl/g, Tg of −60° C. and a value B of 1.3. In the molecular chains, the number of vinyl double bonds was 0.13, that of vinylidene double bonds was 1.10, that of disubstituted olefin double bonds was <0.01, and that of trisubstituted olefin double bonds was 0.29 (per 1000 carbon atoms).

Example 4

Ethylene/Propylene Copolymerization with [diphenylsilylene($\eta^5$-cyclopentadienyl) ($\eta^5$-2,7-di-t-butylfluorenyl)]zirconium dichloride (50° C.)

The polymerization was performed in the same manner as in Example 1, except that 0.00230 mmol of [ethylene ($\eta^5$-cyclopentadienyl)($\eta^5$-2,7-di-t-butylfluorenyl)] zirconium dichloride was replaced by 0.00288 mmol of [diphenylsilylene($\eta^5$-cyclopentadienyl) ($\eta^5$-2,7-di-t-butylfluorenyl)]zirconium dichloride, 0.688 mmol of MMAO was replaced by 0.868 mmol of MMAO, the flow rate of ethylene was changed from 25 L/hr to 35 L/hr, and the flow rate of propylene was changed from 75 L/hr to 65 L/hr. As a result, 2.31 g of an ethylene-propylene copolymer was obtained. The polymer had an ethylene content of 50.6 mol %, Mw of 27184, Mw/Mn of 1.9, [η] of 0.32 dl/g, Tg of −61° C. and a value B of 1.3. In the molecular chains, the number of vinyl double bonds was <0.01, that of vinylidene double bonds was 0.14, that of disubstituted olefin double bonds was <0.01, and that of trisubstituted olefin double bonds was <0.01 (per 1000 carbon atoms).

Example 5

Ethylene/propylene copolymerization with [methylphenylmethylene($\eta^5$-cyclopentadienyl)($\eta^5$-2,7-di-t-butylfluorenyl)]zirconium dichloride (50° C.)

The polymerization was performed in the same manner as in Example 1, except that 0.00230 mmol of [ethylene($\eta^5$-cyclopentadienyl)($\eta^5$-2,7-di-t-butylfluorenyl)] zirconium dichloride was replaced by 0.00397 mmol of [methylphenylmethylene($\eta^5$-cyclopentadienyl)($\eta^5$-2,7-di-t-butylfluorenyl)]zirconium dichloride, 0.688 mmol of MMAO was replaced by 1.192 mmol of MMAO, the flow rate of ethylene was changed from 25 L/hr to 55 L/hr, and the flow rate of propylene was changed from 75 L/hr to 45 L/hr. As a result, 1.59 g of an ethylene-propylene copolymer was obtained. The polymer had an ethylene content of 49.9 mol %, Mw of 34238, Mw/Mn of 1.9, [η] of 0.40 dl/g, Tg of −60° C. and a value B of 1.3. In the molecular chains, the number of vinyl double bonds was 0.08, that of vinylidene double bonds was 0.90, that of disubstituted olefin double bonds was <0.01, and that of trisubstituted olefin double bonds was 0.22 (per 1000 carbon atoms).

Example 6

Ethylene/Propylene Copolymerization with [methylphenylmethylene($\eta^5$-cyclopentadienyl)($\eta^5$-2,7-di-t-butylfluorenyl)]zirconium dichloride (130° C.)

A 1 L-volume glass polymerizer that had been thoroughly purged with nitrogen was loaded with 250 mL of decane. After the temperature of the system had been increased to 130° C., 25 L/hr of ethylene, 75 L/hr of propylene and 100 L/hr of hydrogen were continuously supplied to the polymerizer. The mixture was stirred at a rotational speed of 600 rpm. Next, 0.2 mmol of triisobutylaluminum was added to the polymerizer. Subsequently, a mixture obtained beforehand by mixing 1.213 mmol of MMAO and 0.00402 mmol of [methylphenylmethylene($\eta^5$-cyclopentadienyl)($\eta^5$-2,7-di-t-butylfluorenyl)]zirconium dichloride for at least 15 minutes in toluene was fed to the polymerizer thereby to initiate the polymerization. The polymerization was performed at 130° C. for 15 minutes while continuously supplying ethylene, propylene and hydrogen. The polymerization was terminated by the addition of a small amount of isobutyl alcohol to the system. The unreacted monomers were purged. The polymer solution obtained was washed with 100 mL of 0.2 mol/L hydrochloric acid three times and with 100 mL of distilled water three times, and was dried with magnesium sulfate. The solvent was distilled off under reduced pressure. The polymer was dried at 80° C. under reduced pressure overnight. As a result, 0.77 g of the ethylene-propylene copolymer was obtained. The polymer had an ethylene content of 54.9 mol %, Mw of 4987, Mw/Mn of 1.8, [η] of 0.08 dl/g, Tg of −71° C. and a value B of 1.2. In the molecular chains, the number of vinyl double bonds was 1.09, that of vinylidene double bonds was 1.74, that of disubstituted olefin double bonds was 0.11, and that of trisubstituted olefin double bonds was 0.28 (per 1000 carbon atoms).

Example 7

Ethylene/propylene copolymerization with [diphenylmethylene($\eta^5$-2-methyl-4-i-propylcyclopentadienyl)($\eta^5$-octamethyloctahydrodibenzofluorenyl)] zirconium dichloride A 2 L-volume stainless steel autoclave that had been thoroughly purged with nitrogen was loaded with 780 mL of heptane and 110 g of propylene. After the temperature of the system had been increased to 110° C., the total pressure was increased to 3 MPaG by supplying hydrogen at 1.35 MPa and ethylene at 0.44 MPa. Next, 0.4 mmol of triisobutylaluminum, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were injected with nitrogen. The polymerization was initiated by stirring the mixture at a rotational speed of 400 rpm. The polymerization was performed at 110° C. for 8 minutes while keeping the total pressure at 3 MPaG by continuously supplying ethylene alone. The polymerization was terminated by the addition of a small amount of ethanol to the system. Unreacted ethylene, propylene and hydrogen were purged. The polymer solution obtained was washed with 1000 mL of 0.2 mol/L hydrochloric acid three times and with 1000 mL of distilled water three times, and was dried with magnesium sulfate. The solvent was distilled off under reduced pressure. The polymer was dried at 80° C. under reduced pressure overnight. As a result, 45.6 g of the ethylene-propylene copolymer was obtained. The polymer had an ethylene content of 55.1 mol %, Mw of 12110, Mw/Mn of 1.8, [$\eta$] of 0.17 dl/g, Tg of −64° C. and a value B of 1.1. In the molecular chains, the number of vinyl double bonds was 0.10, that of vinylidene double bonds was 0.14, that of disubstituted olefin double bonds was <0.01, and that of trisubstituted olefin double bonds was <0.01 (per 1000 carbon atoms). After the hydrogenation process, the total number of such double bonds in the molecular chains was less than 0.1 (per 1000 carbon atoms).

Example 8

Ethylene/Propylene Copolymerization with [diphenylmethylene($\eta^5$-cyclopentadienyl)($\eta^5$-2,7-di-t-butylfluorenyl)]zirconium dichloride The polymerization was performed in the same manner as in Example 7, except that the autoclave was loaded with 740 mL of heptane and 130 g of propylene, the system temperature was increased to 150° C., the total pressure was increased to 3 MPaG by supplying hydrogen at 0.65 MPa and ethylene at 0.26 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.000075 mmol of [diphenylmethylene($\eta^5$-cyclopentadienyl)($\eta^5$-2,7-di-t-butylfluorenyl)]zirconium dichloride and 0.00075 mmol of N,N-dimethylanilinium tetrakis(pentafluorophenyl) borate, and the polymerization was performed at 150° C. for 5 minutes. As a result, 18.0 g of an ethylene-propylene copolymer was obtained. The polymer had an ethylene content of 53.8 mol %, Mw of 10700, Mw/Mn of 1.8, [$\eta$] of 0.16 dl/g, Tg of −65° C. and a value B of 1.2. In the molecular chains, the number of vinyl double bonds was 0.35, that of vinylidene double bonds was 0.96, that of disubstituted olefin double bonds was 0.05, and that of trisubstituted olefin double bonds was 0.07 (per 1000 carbon atoms). After the hydrogenation process, the total number of such double bonds in the molecular chains was 0.3 (per 1000 carbon atoms).

Example 9

Ethylene/Propylene Copolymerization with [methylphenylmethylene($\eta^5$-cyclopentadienyl)($\eta^5$-2,7-di-t-butylfluorenyl)]zirconium dichloride The polymerization was performed in the same manner as in Example 7, except that the autoclave was loaded with 850 mL of heptane and 75 g of propylene, the system temperature was increased to 150° C., the total pressure was increased to 3 MPaG by supplying hydrogen at 1.56 MPa and ethylene at 0.11 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.00015 mmol of [methylphenylmethylene($\eta^5$-cyclopentadienyl)($\eta^5$-2,7-di-t-butylfluorenyl)]zirconium dichloride and 0.0015 mmol of N,N-dimethylanilinium tetrakis(pentafluorophenyl) borate, and the polymerization was performed at 150° C. for 5 minutes. As a result, 25.1 g of an ethylene-propylene copolymer was obtained. The polymer had an ethylene content of 48.8 mol %, Mw of 3570, Mw/Mn of 1.8, [$\eta$] of 0.06 dl/g, Tg of −76° C. and a value B of 1.1. In the molecular chains, the number of vinyl double bonds was 0.70, that of vinylidene double bonds was 2.51, that of disubstituted olefin double bonds was 0.02, and that of trisubstituted olefin double bonds was 0.15 (per 1000 carbon atoms). After the hydrogenation process, the total number of such double bonds in the molecular chains was less than 0.1 (per 1000 carbon atoms).

Example 10

Ethylene/Propylene Copolymerization with [methylphenylmethylene($\eta^5$-cyclopentadienyl)($\eta^5$-2,7-di-t-butylfluorenyl)]zirconium dichloride The polymerization was performed in the same manner as in Example 7, except that the autoclave was loaded with 710 mL of heptane and 145 g of propylene, the system temperature was increased to 150° C., the total pressure was increased to 3 MPaG by supplying hydrogen at 0.40 MPa and ethylene at 0.27 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.00010 mmol of [methylphenylmethylene($\eta^5$-cyclopentadienyl)($\eta^5$-2,7-di-t-butylfluorenyl)]zirconium dichloride and 0.001 mmol of N,N-dimethylanilinium tetrakis(pentafluorophenyl) borate, and the polymerization was performed at 150° C. for 5 minutes. As a result, 52.2 g of an ethylene-propylene copolymer was obtained. The polymer had an ethylene content of 53.1 mol %, Mw of 9660, Mw/Mn of 1.9, [$\eta$] of 0.14 dl/g, Tg of −66° C. and a value B of 1.2. In the molecular chains, the number of vinyl double bonds was 0.59, that of vinylidene double bonds was 2.14, that of disubstituted olefin double bonds was 0.06, and that of trisubstituted olefin double bonds was 0.25 (per 1000 carbon atoms). After the hydrogenation process, the total number of such double bonds in the molecular chains was 0.2 (per 1000 carbon atoms).

Example 11

Ethylene/Propylene Copolymerization with [methylphenylmethylene($\eta^5$-cyclopentadienyl)($\eta^5$-2,7-di-t-but ylfluorenyl)]zirconium dichloride The polymerization was performed in the same manner as in Example 7, except that the autoclave was loaded with 910 mL of heptane and 45 g of propylene, the system temperature was increased to 130° C., the total pressure was increased to 3 MPaG by supplying hydrogen at 2.24 MPa and ethylene at 0.09 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.00060 mmol of [methylphenylmethylene($\eta^5$-cyclopentadienyl)($\eta^5$-2,7-di-t-but ylfluorenyl)]zirconium dichloride and 0.006 mmol of N,N-dimethylanilinium tetrakis(pentafluorophenyl) borate, and the polymerization was performed at 130° C. for 5 minutes. As a result, 22.9 g of an ethylene-propylene copolymer was obtained. The polymer had an ethylene content of 51.9 mol %, Mw of 2680, Mw/Mn of 1.6, [η] of 0.05 dl/g, Tg of −77° C. and a value B of 1.1. In the molecular chains, the number of vinyl double bonds was 0.24, that of vinylidene double bonds was 1.39, that of disubstituted olefin double bonds was 0.17, and that of trisubstituted olefin double bonds was 0.05 (per 1000 carbon atoms). After the hydrogenation process, the total number of such double bonds in the molecular chains was less than 0.1 (per 1000 carbon atoms).

Comparative Example 1

Ethylene/Propylene Copolymerization with [bis($\eta^5$-1,3-dimethylcyclopentadienyl)]zirconium dichloride The polymerization was performed in the same manner as in Example 7, except that the autoclave was loaded with 210 mL of heptane and 395 g of propylene, the system temperature was increased to 80° C., the total pressure was increased to 3 MPaG by supplying hydrogen in 300 mL and ethylene at 0.32 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.00030 mmol of [bis($\eta^5$-1,3-dimethylcyclopentadienyl)]zirconium dichloride and 0.003 mmol of N,N-dimethylanilinium tetrakis(pentafluorophenyl) borate, and the polymerization was performed at 80° C. for 5 minutes. As a result, 23.3 g of an ethylene-propylene copolymer was obtained. The polymer had an ethylene content of 52.2 mol %, Mw of 4420, Mw/Mn of 2.2, [η] of 0.08 dl/g, Tg of −74° C. and a value B of 1.0. In the molecular chains, the number of vinyl double bonds was 0.08, that of vinylidene double bonds was 9.11, that of disubstituted olefin double bonds was 0.08, and that of trisubstituted olefin double bonds was 0.20 (per 1000 carbon atoms). After the hydrogenation process, the total number of such double bonds remaining in the molecular chains was above 1 (per 1000 carbon atoms).

Comparative Example 2

Ethylene/Propylene Copolymerization with [bis($\eta^5$-1-methyl-3-n-butylcyclopentadienyl)]zirconium dichloride The polymerization was performed in the same manner as in Example 7, except that the autoclave was loaded with 210 mL of heptane and 395 g of propylene, the system temperature was increased to 80° C., the total pressure was increased to 3 MPaG by supplying hydrogen in 300 mL and ethylene at 0.32 MPa, 0.00025 mmol of [diphenylmethylene($\eta^5$-2-methyl-4-i-propylcyclopentadienyl)($\eta^5$-octamethyloctahydrodibenzofluorenyl)]zirconium dichloride and 0.0010 mmol of N,N-dimethylanilinium tetrakis(pentafluorophenyl) borate were replaced by 0.00030 mmol of [bis($\eta^5$-1-methyl-3-n-butylcyclopentadienyl)]zirconium dichloride and 0.003 mmol of N,N-dimethylanilinium tetrakis(pentafluorophenyl) borate, and the polymerization was performed at 80° C. for 5 minutes. As a result, 45.6 g of an ethylene-propylene copolymer was obtained. The polymer had an ethylene content of 51.6 mol %, Mw of 4530, Mw/Mn of 2.1, [η] of 0.08 dl/g, Tg of −75° C. and a value B of 1.0. In the molecular chains, the number of vinyl double bonds was 0.07, that of vinylidene double bonds was 8.98, that of disubstituted olefin double bonds was 0.11, and that of trisubstituted olefin double bonds was 0.13 (per 1000 carbon atoms). After the hydrogenation process, the total number of such double bonds remaining in the molecular chains was above 1 (per 1000 carbon atoms).

Comparative Example 3

Ethylene/Propylene Copolymerization with [bis($\eta^5$-1,3-dimethylcyclopentadienyl)]zirconium dichloride (50° C.)

The polymerization was performed in the same manner as in Example 1, except that 0.00230 mmol of [ethylene($\eta^5$-cyclopentadienyl) ($\eta^5$-2,7-di-t-butylfluorenyl)] zirconium dichloride was replaced by 0.00622 mmol of [bis($\eta^5$-1,3-dimethylcyclopentadienyl)]zirconium dichloride, 0.688 mmol of MMAO was replaced by 1.871 mmol of MMAO, the flow rate of ethylene was changed from 25 L/hr to 5 L/hr, the flow rate of propylene was changed from 75 L/hr to 95 L/hr, and the flow rate of hydrogen was changed from 100 L/hr to 0 L/hr. As a result, 0.72 g of an ethylene-propylene copolymer was obtained. The polymer had an ethylene content of 52.5 mol %, Mw of 4620, Mw/Mn of 2.0, [η] of 0.08 dl/g, Tg of −73° C. and a value B of 1.2. In the molecular chains, the number of vinyl double bonds was 0.07, that of vinylidene double bonds was 10.68, that of disubstituted olefin double bonds was 0.08, and that of trisubstituted olefin double bonds was 0.13 (per 1000 carbon atoms).

Comparative Example 4

Ethylene/Propylene Copolymerization with [bis($\eta^5$-1-methyl-3-n-butylcyclopentadienyl)]zirconium dichloride (50° C.)

The polymerization was performed in the same manner as in Example 1, except that 0.00230 mmol of [ethylene($\eta^5$-cyclopentadienyl)($\eta^5$-2,7-di-t-butylfluorenyl)] zirconium dichloride was replaced by 0.00720 mmol of [bis($\eta^5$-1-methyl-3-n-butylcyclopentadienyl)]zirconium dichloride, 0.688 mmol of MMAO was replaced by 2.160 mmol of MMAO, the flow rate of ethylene was changed from 25 L/hr to 10 L/hr, the flow rate of propylene was changed from 75 L/hr to 90 L/hr, and the flow rate of hydrogen was changed from 100 L/hr to 0 L/hr. As a result, 1.19 g of an ethylene-propylene copolymer was obtained. The polymer had an ethylene content of 46.9 mol %, Mw of 3627, Mw/Mn of 2.0, [η] of 0.06 dl/g, Tg of −76° C. and a value B of 1.2. In the molecular chains, the number of vinyl double bonds was 0.05, that of vinylidene double bonds was 12.35, that of disubstituted olefin double bonds was 0.06, and that of trisubstituted olefin double bonds was 0.11 (per 1000 carbon atoms).

TABLE 1

| | Components (A) | | Components (B) | | | | Ethylene flow rate | Propylene flow rate | Hydrogen flow rate | Polymerization temperature | Polymerization time | Polymer yield | Mileage |
| | | | (B-1) | | (B-2) | | | | | | | | |
| | Type | mmol | Type | mmol | Type | mmol | L/hr | L/hr | L/hr | °C. | min | g | kg/mmol-Zr |
|---|---|---|---|---|---|---|---|---|---|---|---|---|---|
| Ex. 1 | i | 0.00230 | a | 0.2 | b | 0.688 | 25 | 75 | 100 | 50 | 15 | 1.43 | 0.62 |
| Ex. 2 | ii | 0.00202 | a | 0.2 | b | 0.607 | 55 | 45 | 100 | 50 | 15 | 1.60 | 0.79 |
| Ex. 3 | iii | 0.00215 | a | 0.2 | b | 0.645 | 55 | 45 | 100 | 50 | 15 | 1.40 | 0.65 |
| Ex. 4 | iv | 0.00288 | a | 0.2 | b | 0.868 | 35 | 65 | 100 | 50 | 15 | 2.31 | 0.80 |
| Ex. 5 | v | 0.00397 | a | 0.2 | b | 1.192 | 55 | 45 | 100 | 50 | 15 | 1.59 | 0.40 |
| Ex. 6 | v | 0.00402 | a | 0.2 | b | 1.213 | 25 | 75 | 100 | 130 | 15 | 0.77 | 0.19 |
| Comp. Ex. 3 | viii | 0.00622 | a | 0.2 | b | 1.871 | 5 | 95 | 0 | 50 | 15 | 0.72 | 0.12 |
| Comp. Ex. 4 | ix | 0.00720 | a | 0.2 | b | 2.160 | 10 | 90 | 0 | 50 | 15 | 1.19 | 0.17 |

| | Ethylene/ propylene contents mol %/mol % | Mw | Mn | Mw/Mn | [η] dl/g | Tg °C. | Value B | Numbers of double bonds in molecular chains | | | | |
| | | | | | | | | Vinyl Bonds/ 1000 C | Vinylidene Bonds/ 1000 C | Disubstituted Bonds/ 1000 C | Trisubstituted Bonds/ 1000 C | Total Bonds/ 1000 C |
|---|---|---|---|---|---|---|---|---|---|---|---|---|
| Ex. 1 | 48.4/51.6 | 17430 | 8490 | 2.1 | 0.23 | −63 | 1.3 | 0.05 | 0.29 | <0.01 | 0.09 | 0.43 |
| Ex. 2 | 51.3/48.7 | 18380 | 10330 | 1.8 | 0.24 | −62 | 1.1 | 0.04 | 0.12 | <0.01 | 0.06 | 0.22 |
| Ex. 3 | 54.3/45.7 | 28805 | 15363 | 1.9 | 0.34 | −60 | 1.3 | 0.13 | 1.10 | <0.01 | 0.29 | 1.51 |
| Ex. 4 | 50.6/49.4 | 27184 | 14132 | 1.9 | 0.32 | −61 | 1.3 | <0.01 | 0.14 | <0.01 | <0.01 | 0.14 |
| Ex. 5 | 49.9/50.1 | 34238 | 17888 | 1.9 | 0.40 | −60 | 1.3 | 0.08 | 0.90 | <0.01 | 0.22 | 1.19 |
| Ex. 6 | 54.9/45.1 | 4987 | 2806 | 1.8 | 0.08 | −71 | 1.2 | 1.09 | 1.74 | 0.11 | 0.28 | 3.22 |
| Comp. Ex. 3 | 52.5/47.5 | 4620 | 2260 | 2.0 | 0.08 | −73 | 1.2 | 0.07 | 10.68 | 0.08 | 0.13 | 10.96 |
| Comp. Ex. 4 | 46.9/53.1 | 3627 | 1837 | 2.0 | 0.06 | −76 | 1.2 | 0.05 | 12.35 | 0.06 | 0.11 | 12.57 |

The types of the components (A), the component (B-1) and the component (B-2) in Table 1 are as follows.

⟨Components (A)⟩
i: [ethylene ($\eta^5$-cyclopentadienyl)($\eta^5$-2,7-di-t-butylfluorenyl)] zirconium dichloride
ii: [diphenylmethylene($\eta^5$-2-methyl-4-t-butylcyclopentadienyl)($\eta^5$-2,7-di-t-butylfluorenyl)]zirconium dichloride
iii: [dimethylmethylene($\eta^5$-cyclopentadienyl) ($\eta^5$-2,7-di-t-butylfluorenyl)]zirconium dichloride
iv: [diphenylsilylene($\eta^5$-cyclopentadienyl)($\eta^5$-2,7-di-t-butylfluorenyl)]zirconium dichloride
v: [methylphenylmethylene($\eta^5$-cyclopentadienyl)($\eta^5$-2,7-di-t-butylfluorenyl)]zirconium dichloride
viii: [bis($\eta^5$-1,3-dimethylcyclopentadienyl)]zirconium dichloride
ix: [bis($\eta^5$-1-methyl-3-n-butylcyclopentadienyl)]zirconium dichloride <Component (B-1)>
a: triisobutylaluminum <Component (B-2)>
b: MMAO

TABLE 2

| | Components (A) | | Components (B) | | | | Hep- tane | Pro- pylene | Hydrogen partial pressure | Ethylene partial pressure | Total pressure | Polymer- ization temperature | Polymer- ization time | Polymer yield | Mileage kg/ mmol- Zr |
| | | | (B-1) | | (B-3) | | | | | | | | | | |
| | Type | mmol | Type | mmol | Type | mmol | mL | g | MPa | MPa | MPa | °C. | min | g | |
|---|---|---|---|---|---|---|---|---|---|---|---|---|---|---|---|
| Ex. 7 | vi | 0.00025 | a | 0.4 | c | 0.0010 | 780 | 110 | 1.35 | 0.44 | 3 | 110 | 8 | 45.6 | 182 |
| Ex. 8 | vii | 0.000075 | a | 0.4 | c | 0.00075 | 740 | 130 | 0.65 | 0.26 | 3 | 150 | 5 | 18.0 | 240 |
| Ex. 9 | v | 0.00015 | a | 0.4 | c | 0.0015 | 850 | 75 | 1.56 | 0.11 | 3 | 150 | 5 | 25.1 | 167 |
| Ex. 10 | v | 0.00010 | a | 0.4 | c | 0.001 | 710 | 145 | 0.40 | 0.27 | 3 | 150 | 5 | 52.2 | 522 |
| Ex. 11 | v | 0.00060 | a | 0.4 | c | 0.006 | 910 | 45 | 2.24 | 0.09 | 3 | 130 | 5 | 22.9 | 38 |
| Comp. Ex. 1 | viii | 0.00030 | a | 0.4 | c | 0.003 | 210 | 395 | 300 mL | 0.32 | 3 | 80 | 5 | 23.3 | 78 |
| Comp. Ex. 2 | ix | 0.00030 | a | 0.4 | c | 0.003 | 210 | 395 | 300 mL | 0.32 | 3 | 80 | 5 | 45.6 | 152 |

| | Ethylene/ propylene contents mol %/mol % | Mw | Mn | Mw/Mn | [η] dl/g | Tg °C. | Value B | Numbers of double bonds in molecular chains | | | | |
| | | | | | | | | Vinyl Bonds/ 1000 C | Vinylidene Bonds/ 1000 C | Disubstituted Bonds/ 1000 C | Trisubstituted Bonds/ 1000 C | Total Bonds/ 1000 C |
|---|---|---|---|---|---|---|---|---|---|---|---|---|
| Ex. 7 | 55.1/44.9 | 12110 | 6760 | 1.8 | 0.17 | −64 | 1.1 | 0.10 | 0.14 | <0.01 | <0.01 | 0.24 |
| Ex. 8 | 53.8/46.2 | 10700 | 5810 | 1.8 | 0.16 | −65 | 1.2 | 0.35 | 0.96 | 0.05 | 0.07 | 1.42 |
| Ex. 9 | 48.8/51.2 | 3570 | 2000 | 1.8 | 0.06 | −76 | 1.1 | 0.70 | 2.51 | 0.02 | 0.15 | 3.38 |
| Ex. 10 | 53.1/46.9 | 9660 | 5200 | 1.9 | 0.14 | −66 | 1.2 | 0.59 | 2.14 | 0.06 | 0.25 | 3.04 |

TABLE 2-continued

| | | | | | | | | | | | | |
|---|---|---|---|---|---|---|---|---|---|---|---|---|
| Ex. 11 | 51.9/48.1 | 2680 | 1640 | 1.6 | 0.05 | −77 | 1.1 | 0.24 | 1.39 | 0.17 | 0.05 | 1.85 |
| Comp. Ex. 1 | 52.2/47.8 | 4420 | 2030 | 2.2 | 0.08 | −74 | 1.0 | 0.08 | 9.11 | 0.08 | 0.20 | 9.46 |
| Comp. Ex. 2 | 51.6/48.4 | 4530 | 2190 | 2.1 | 0.08 | −75 | 1.0 | 0.07 | 8.98 | 0.11 | 0.13 | 9.28 |

The types of the components (A), the component (B-1) and the component (B-3) in Table 2 are as follows.

⟨Components (A)⟩ vi: [diphenylmethylene($\eta^5$-2-methyl-4-i-propylcyclopentadienyl)($\eta^5$-octamethyloctahydrodibenzofluorenyl)]zirconium dichloride vii: [diphenylmethylene($\eta^5$-cyclopentadienyl)($\eta^5$-2,7-di-t-butylfluorenyl)]zirconium dichloride v: [methylphenylmethylene($\eta^5$-cyclopentadienyl)($\eta^5$-2,7-di-t-butylfluorenyl)]zirconium dichloride viii: [bis($\eta^5$-1,3-dimethylcyclopentadienyl)]zirconium dichloride ix: [bis($\eta^5$-1-methyl-3-n-butylcyclopentadienyl)]zirconium dichloride <Component (B-1)>
a: triisobutylaluminum <Component (B-3)>
c: N,N-dimethylanilinium tetrakis(pentafluorophenyl) borate

[Preparation of Lubricating Oil Compositions]

In the preparation of lubricating oil compositions described below, the following components were used in addition to the ethylene/α-olefin copolymers.

Low-viscosity base oils: Synthetic hydrocarbon oil PAO (NEXBASE 2006 manufactured by NESTE, PAO-6) having a kinematic viscosity at 100° C. of 5.8 mm$^2$/s, API (American Petroleum Institute) Group II mineral oil (YUBASE-L3 (mineral oil A) manufactured by SK LUBRICANTS) having a kinematic viscosity at 100° C. of 3.0 mm$^2$/s, and API Group III mineral oils (YUBASE-4 (mineral oil B) and YUBASE-6 (mineral oil C) manufactured by SK LUBRICANTS) having kinematic viscosities at 100° C. of 4.2 mm$^2$/s and 6.5 mm$^2$/s, respectively.

Polymethacrylates: VISCOPLEX 0-220 (number average molecular weight 23,000, PMA-A) and VISCOPLEX 0-110 (number average molecular weight 9,100, PMA-B) manufactured by EVONIK Polybutenes: Nisseki Polybutenes HV-1900 (PB-A) and HV-300 (PB-B) manufactured by JX Nippon Oil & Energy Corporation Fatty acid ester: SYNATIVE ES TSTC manufactured by BASF Extreme pressure additive package: HITEC-3339 manufactured by AFTON CHEMICAL Automatic transmission oil DI package: HITEC-2426 manufactured by AFTON CHEMICAL Pour-point depressant: IRGAFLO 720P manufactured by BASF ⟨Automobile Gear Oils⟩

In Formulation Examples 1 to 3, the formulations were controlled so that the kinematic viscosity at 100° C. would be about 14.0 mm$^2$/s to meet SAE (Society of Automobile Engineers) Gear Oil Viscosity Grade 90. Table 3 sets forth the lubricating oil characteristics of the lubricating oil compositions obtained in Formulation Examples and Comparative Formulation Examples described below.

Formulation Example 1

The hydrogenated copolymer obtained in Example 9, the fatty acid ester and the extreme pressure additive package were blended so that their proportions would be 40.5 mass %, 15.0 mass % and 3.9 mass %, respectively. PAO-6 was added to the blend in such an amount that the total mass would be 100 mass %.

Formulation Example 2

The hydrogenated copolymer obtained in Example 10, the fatty acid ester and the extreme pressure additive package were blended so that their proportions would be 14.0 mass %, 15.0 mass % and 3.9 mass %, respectively. PAO-6 was added to the blend in such an amount that the total mass would be 100 mass %.

Formulation Example 3

The hydrogenated copolymer obtained in Example 8, the fatty acid ester and the extreme pressure additive package were blended so that their proportions would be 12.5 mass %, 15.0 mass % and 6.5 mass %, respectively. PAO-6 was added to the blend in such an amount that the total mass would be 100 mass %.

Comparative Formulation Example 1

PMA-A, the fatty acid ester and the extreme pressure additive package were blended so that their proportions would be 18.4 mass %, 15.0 mass % and 3.9 mass %, respectively. PAO-6 was added to the blend in such an amount that the total mass would be 100 mass %.

Comparative Formulation Example 2

PMA-B, the ester and the extreme pressure additive package were blended so that their proportions would be 31.4 mass %, 15.0 mass % and 3.9 mass %, respectively. PAO-6 was added to the blend in such an amount that the total mass would be 100 mass %.

TABLE 3

| | | Form. Ex. 1 | Form. Ex. 2 | Form. Ex. 3 | Comp. Form. Ex. 1 | Comp. Form. Ex. 2 |
|---|---|---|---|---|---|---|
| Copolymer of Ex. 9 | mass % | 40.5 | | | | |
| Copolymer of Ex. 10 | mass % | | 14.0 | | | |
| Copolymer of Ex. 8 | mass % | | | 12.5 | | |
| PMA-A | mass % | | | | 18.4 | |
| PMA-B | mass % | | | | | 31.4 |

TABLE 3-continued

|  |  | Form. Ex. 1 | Form. Ex. 2 | Form. Ex. 3 | Comp. Form. Ex. 1 | Comp. Form. Ex. 2 |
|---|---|---|---|---|---|---|
| PAO-6 | mass % | 40.6 | 67.1 | 70.5 | 62.7 | 49.7 |
| Fatty acid ester | mass % | 15 | 15 | 15 | 15 | 15 |
| Extreme pressure additive package | mass % | 3.9 | 3.9 | 3.9 | 3.9 | 3.9 |
| Kinematic viscosity at 100° C. | mm$^2$/s | 13.9 | 13.8 | 13.9 | 14.0 | 14.0 |
| Kinematic viscosity at 40° C. | mm$^2$/s | 92.8 | 84.5 | 85.1 | 73.5 | 85.2 |
| Viscosity index | — | 153 | 166 | 168 | 198 | 168 |
| Low-temperature viscosity (−40° C.) | mPa·s | 49,000 | 32,000 | 30,000 | 21,000 | 41,000 |
| KRL shear stability | % | <1.0 | 1.2 | 4.2 | 29.8 | 4.5 |

The above viscosity of gear oils is suited for applications such as automobile differential gear oils and manual transmission oils. The lubricating oil compositions which contained the copolymers obtained in accordance with the present invention achieved much higher shear stability than the composition of Comparative Formulation Example 1 which involved PMA-A generally used in automobile gear oils. As compared to the composition of Comparative Formulation Example 2 which exhibited higher shear stability than in Comparative Formulation Example 1, the inventive compositions compared equally in shear stability but compared favorably in low-temperature viscosity.

⟨Automobile Automatic Transmission Oils⟩

In Formulation Examples 4 and 5, the formulations involved the automatic transmission oil DI package and were controlled so that the kinematic viscosity at 100° C. would be less than 5.5 mm$^2$/s to allow a comparison with a commercial automatic transmission oil (AUTO FLUID WS manufactured by TOYOTA MOTOR CORPORATION). Table 4 describes the lubricating oil characteristics of lubricating oil compositions obtained.

Formulation Example 4

The hydrogenated copolymer obtained in Example 10, the DI package and the pour-point depressant were blended so that their proportions would be 2.8 mass %, 8.0 mass % and 0.5 mass %, respectively. A low-viscosity base oil containing the mineral oil A and the mineral oil B in a mass ratio of 2:3 was added to the blend in such an amount that the total mass would be 100 mass %.

Formulation Example 5

The hydrogenated copolymer obtained in Example 8, the DI package and the pour-point depressant were blended so that their proportions would be 2.5 mass %, 8.0 mass % and 0.5 mass %, respectively. A low-viscosity base oil containing the mineral oil A and the mineral oil B in a mass ratio of 2:3 was added to the blend in such an amount that the total mass would be 100 mass %.

TABLE 4

|  |  | Form. Ex. 4 | Form. Ex. 5 | Commercial automatic transmission oil |
|---|---|---|---|---|
| Copolymer of Ex. 10 | mass % | 2.8 |  |  |
| Copolymer of Ex. 8 | mass % |  | 2.5 |  |
| PB-A | mass % |  |  |  |
| PB-B | mass % |  |  |  |
| Mineral oil A | mass % | 35.5 | 35.6 |  |
| Mineral oil B | mass % | 53.2 | 53.4 |  |
| Pour-point depressant | mass % | 0.5 | 0.5 |  |
| DI package | mass % | 8.0 | 8.0 |  |
| Kinematic viscosity at 100° C. | mm$^2$/s | 5.47 | 5.45 | 5.46 |
| Kinematic viscosity at 40° C. | mm$^2$/s | 25.9 | 25.3 | 23.4 |
| Viscosity index | — | 152 | 156 | 182 |
| Low-temperature viscosity (−40° C.) | mPa·s | 8,100 | 7,900 | 10,200 |
| Ultrasonic shear stability | % | <1.0 | <1.0 | 2.3 |

The use of the inventive copolymers in automatic transmission oils has been shown to provide extremely excellent shear stability in addition to a viscosity index and a low-temperature viscosity comparable to those of commercial oils. That is, the use of the copolymers obtained in accordance with the invention makes it possible to reduce the initial viscosity as produced to a greater extent than heretofore possible.

By changing the DI package, similar formulations provide similar effects also in variable transmission oils. The oils may be suitably used as manual transmission oils by replacing the DI package with an extreme pressure additive package.

⟨Industrial Lubricating Oils⟩

In Formulation Examples 6 and 7, the formulations were controlled so that the kinematic viscosity at 40° C. would be about 288 to 352 mm$^2$/s to meet ISO (International Organization for Standardization) viscosity grade 320 (ISO VG320). Table 5 describes the lubricating oil characteristics of lubricating oil compositions obtained in Formulation Examples and Comparative Formulation Examples below.

Formulation Example 6

The hydrogenated copolymer obtained in Example 10, the pour-point depressant and the extreme pressure additive package were blended so that their proportions would be 32.2 mass %, 0.5 mass % and 1.2 mass %, respectively. The mineral oil C was added to the blend in such an amount that the total mass would be 100 mass %.

Formulation Example 7

The hydrogenated copolymer obtained in Example 8, the pour-point depressant and the extreme pressure additive package were blended so that their proportions would be 28.1 mass %, 0.5 mass % and 1.2 mass %, respectively. The mineral oil C was added to the blend in such an amount that the total mass would be 100 mass %.

Comparative Formulation Example 3

PB-A, the pour-point depressant and the extreme pressure additive package were blended so that their proportions would be 28.6 mass %, 0.5 mass % and 1.2 mass %, respectively. The mineral oil C was added to the blend in such an amount that the total mass would be 100 mass %.

Comparative Formulation Example 4

PB-B, the pour-point depressant and the extreme pressure additive package were blended so that their proportions would be 41.4 mass %, 0.5 mass % and 1.2 mass %, respectively. The mineral oil C was added to the blend in such an amount that the total mass would be 100 mass %.

TABLE 5

|  |  | Form. Ex. 6 | Form. Ex. 7 | Comp. Form. Ex. 3 | Comp. Form. Ex. 4 |
|---|---|---|---|---|---|
| Copolymer of Ex. 10 | mass % | 32.2 | | | |
| Copolymer of Ex. 8 | mass % | | 28.1 | | |
| PB-A | mass % | | | 28.6 | |
| PB-B | mass % | | | | 41.4 |
| Mineral oil C | mass % | 66.1 | 70.2 | 69.7 | 56.9 |
| Pour-point depressant | mass % | 0.5 | 0.5 | 0.5 | 0.5 |
| Extreme pressure additive package | mass % | 1.2 | 1.2 | 1.2 | 1.2 |
| Kinematic viscosity at 40° C. | mm²/s | 331 | 337 | 308 | 301 |
| Low-temperature viscosity (−30° C.) | mPa·s | 135,000 | 128,000 | 163,000 | 242,000 |

The lubricating oil compositions which contained the inventive copolymers attained a marked enhancement in low-temperature viscosity as compared to Comparative Formulation Examples which involved the polybutenes.

The invention claimed is:

1. An ethylene/α-olefin copolymer obtained by copolymerizing ethylene and an α-olefin having 3 to 20 carbon atoms in the presence of an olefin polymerization catalyst comprising:

a bridged metallocene compound (A) represented by the general formula [I] below, and at least one compound (B) selected from the group consisting of organometallic compounds (B-1), organoaluminum oxy compounds (B-2) and compounds (B-3) capable of reacting with the bridged metallocene compound (A) to form an ion pair, the ethylene/α-olefin copolymer satisfying the following conditions (1) to (4):

(1) the weight average molecular weight is in the range of 1,000 to 50,000;

(2) the molecular weight distribution (Mw/Mn, Mw: weight average molecular weight, Mn: number average molecular weight) measured by gel permeation chromatography (GPC) is not more than 2.5;

(3) the glass transition point (Tg) measured with a differential scanning calorimeter (DSC) is below −50° C.; and (4) the value B represented by the equation [1] below is not less than 1.2;

[Math. 1]

$$B = \frac{P_{OE}}{2 P_O \cdot P_E} \quad [1]$$

(in the equation [1], PE is the molar fraction of ethylene components, PO is the molar fraction of α-olefin components, and $P_{OE}$ is the molar fraction of ethylene α-olefin sequences relative to all dyad sequences);

[Chem. 1]

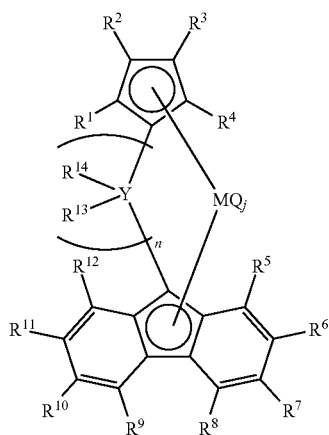

(in the formula [I],
$R^1$, $R^2$, $R^3$ and $R^4$ are all hydrogen atoms,
$R^5$, $R^6$, $R^7$, $R^8$, $R^9$, $R^{10}$, $R^{11}$ and $R^{12}$ are each an atom or a substituent selected from the group consisting of a hydrogen atom, a hydrocarbon group having 1 to 20 carbon atoms, a silicon-containing group, a nitrogen-containing group, an oxygen-containing group, a halogen atom and a halogen-containing group, and may be the same as or different from one another,
$R^{13}$ and $R^{14}$ are each an atom or a substituent selected from the group consisting of a hydrogen atom, a hydrocarbon group having 1 to 20 carbon atoms, an aryl group, a substituted aryl group, a silicon-containing group, a nitrogen-containing group, an oxygen-containing group, a halogen atom and a halogen-containing group, and may be the same as or different from each other,
any adjacent substituents among $R^1$ to $R^{14}$ may be bonded together to form a ring,
Y is selected from Group XIV atoms,
M is a titanium atom, a zirconium atom or a hafnium atom,
Q is a halogen atom, a hydrocarbon group having 1 to 20 carbon atoms, an anionic ligand or a neutral ligand capable of coordination through a lone pair of electrons, and may be the same or different when plural,
n is 1, and
j is an integer of 1 to 4).

2. The ethylene/α-olefin copolymer according to claim 1, wherein one of $R^{13}$ and $R^{14}$ in the general formula [I] is an aryl group or a substituted aryl group.

3. The ethylene/α-olefin copolymer according to claim 2, wherein one of $R^{13}$ and $R^{14}$ in the general formula [I] is an aryl group or a substituted aryl group and the other is an alkyl group having 1 to 20 carbon atoms.

4. The ethylene/α-olefin copolymer according to claim 1, wherein M in the general formula [I] is a zirconium atom.

5. The ethylene/α-olefin copolymer according to claim 1, wherein the compound (B-3) is used as the component (B).

6. The ethylene/α-olefin copolymer according to claim 1, wherein the polymerization temperature in the copolymerization is not less than 130° C.

7. The ethylene/α-olefin copolymer according to claim 1, wherein the copolymer contains ethylene-derived structural units in the range of 30 to 70 mol %.

8. A lubricating oil composition comprising the ethylene/α-olefin copolymer described in claim 1.

9. An automobile lubricating oil comprising the lubricating oil composition described in claim 8.

10. The automobile lubricating oil according to claim 9, which is used as an automobile transmission oil and has a kinematic viscosity at 100° C. of not more than 7.5 mm$^2$/s.

11. An industrial lubricating oil comprising the lubricating oil composition described in claim 8.

12. A lubricating oil composition comprising the ethylene/α-olefin copolymer of claim 1.

13. An automobile lubricating oil comprising the lubricating oil composition described in claim 12.

14. The automobile lubricating oil according to claim 13, which is used as an automobile transmission oil and has a kinematic viscosity at 100° C. of not more than 7.5 mm$^2$/s.

15. An industrial lubricating oil comprising the lubricating oil composition described in claim 12.

* * * * *